United States Patent
Kale et al.

(10) Patent No.: US 11,250,648 B2
(45) Date of Patent: Feb. 15, 2022

(54) PREDICTIVE MAINTENANCE OF AUTOMOTIVE TRANSMISSION

(71) Applicant: Micron Technology, Inc., Boise, ID (US)

(72) Inventors: Poorna Kale, Folsom, CA (US); Robert Richard Noel Bielby, Placerville, CA (US)

(73) Assignee: Micron Technology, Inc., Boise, ID (US)

( * ) Notice: Subject to any disclaimer, the term of this patent is extended or adjusted under 35 U.S.C. 154(b) by 204 days.

(21) Appl. No.: 16/719,181

(22) Filed: Dec. 18, 2019

(65) Prior Publication Data
US 2021/0192860 A1 Jun. 24, 2021

(51) Int. Cl.
G07C 5/00 (2006.01)
G06N 3/08 (2006.01)
G07C 5/08 (2006.01)
B60Q 9/00 (2006.01)
F16H 57/01 (2012.01)
G05D 1/02 (2020.01)

(52) U.S. Cl.
CPC ............... *G07C 5/006* (2013.01); *B60Q 9/00* (2013.01); *F16H 57/01* (2013.01); *G06N 3/08* (2013.01); *G07C 5/008* (2013.01); *G07C 5/085* (2013.01); *G07C 5/0808* (2013.01); F16H 2057/012 (2013.01); G05D 1/021 (2013.01)

(58) Field of Classification Search
CPC ...... G07C 5/006; G07C 5/008; G07C 5/0808; G07C 5/085; B60Q 9/00; F16H 57/01; F16H 2057/012; G06N 3/08; G05D 1/021

USPC ........................................................ 701/29.4
See application file for complete search history.

(56) References Cited

U.S. PATENT DOCUMENTS

| | | | |
|---|---|---|---|
| 5,745,031 A | 4/1998 | Yamamoto | |
| 5,781,700 A | 7/1998 | Puskorius et al. | |
| 6,097,295 A | 8/2000 | Griesinger et al. | |
| 6,594,579 B1 * | 7/2003 | Lowrey | G08G 1/20 340/439 |
| 6,661,345 B1 | 12/2003 | Bevan et al. | |
| 6,832,510 B2 | 12/2004 | Kusase | |
| 7,389,682 B2 | 6/2008 | Javaherian | |
| 7,392,129 B2 * | 6/2008 | Hill | F02D 35/02 701/105 |
| 8,924,124 B2 * | 12/2014 | Lockwood | F02D 41/0007 701/102 |

(Continued)

*Primary Examiner* — Gertrude Arthur Jeanglaude
(74) *Attorney, Agent, or Firm* — Greenberg Traurig

(57) ABSTRACT

Systems, methods and apparatuses of predictive maintenance of automotive transmission of vehicles. For example, the transmission has at least one sensor to measure a temperature in transmission fluid, the torque applied on a shaft of the transmission, a vibration sensor, and/or a microphone. During a period in which the vehicle is assumed to be operating normally, the sensor data generated by the transmission sensor(s) is used to train an artificial neural network to recognize the normal patterns in the sensor data. Subsequently, the trained artificial neural network is used to determine whether the current sensor data from the transmission sensor(s) are abnormal. A maintenance alert can be generated for the vehicle in response to a determination that the operations of the transmission are abnormal according to the artificial neural network and the current sensor data.

20 Claims, 10 Drawing Sheets

(56) References Cited

U.S. PATENT DOCUMENTS

| | | |
|---|---|---|
| 9,802,571 B2 | 10/2017 | Shreve et al. |
| 10,013,773 B1 | 7/2018 | Ogale et al. |
| 10,242,665 B1 | 3/2019 | Abeloe |
| 10,507,793 B1 | 12/2019 | De Moura Partika |
| 10,993,647 B2 | 5/2021 | Kale et al. |
| 11,042,350 B2 | 6/2021 | Bielby et al. |
| 2001/0002936 A1 | 6/2001 | Tsuji et al. |
| 2004/0036261 A1 | 2/2004 | Breed |
| 2004/0090314 A1 | 5/2004 | Iwamoto |
| 2004/0193347 A1 | 9/2004 | Harumoto et al. |
| 2005/0201565 A1 | 9/2005 | Choi et al. |
| 2005/0270178 A1 | 12/2005 | Ioli |
| 2005/0285758 A1 | 12/2005 | Matsukawa et al. |
| 2007/0008151 A1 | 1/2007 | Victor et al. |
| 2007/0065002 A1 | 3/2007 | Marzell et al. |
| 2007/0140030 A1 | 6/2007 | Wyatt |
| 2007/0279493 A1 | 12/2007 | Edanami |
| 2008/0007567 A1 | 1/2008 | Clatworthy et al. |
| 2008/0036187 A1 | 2/2008 | Breed |
| 2008/0147265 A1 | 6/2008 | Breed |
| 2008/0177683 A1 | 7/2008 | No et al. |
| 2008/0260239 A1 | 10/2008 | Han et al. |
| 2009/0141575 A1 | 6/2009 | Kohler et al. |
| 2010/0109881 A1 | 5/2010 | Eskandarian et al. |
| 2010/0191391 A1 | 7/2010 | Zeng |
| 2011/0172879 A1 | 7/2011 | Abe |
| 2012/0041914 A1 | 2/2012 | Tirunagari |
| 2014/0036076 A1 | 2/2014 | Nerayoff et al. |
| 2014/0132423 A1 | 5/2014 | Choi et al. |
| 2014/0222288 A1 | 8/2014 | Lavoie et al. |
| 2014/0236472 A1 | 8/2014 | Rosario |
| 2015/0195518 A1 | 7/2015 | Shikii et al. |
| 2015/0206014 A1 | 7/2015 | Wu et al. |
| 2015/0217449 A1 | 8/2015 | Meier et al. |
| 2016/0203377 A1 | 7/2016 | Irie et al. |
| 2017/0169625 A1 | 6/2017 | Lavie et al. |
| 2017/0177965 A1 | 6/2017 | Soldevila et al. |
| 2017/0300788 A1 | 10/2017 | Cao et al. |
| 2017/0327094 A1 | 11/2017 | Inoue et al. |
| 2017/0371340 A1 | 12/2017 | Cohen et al. |
| 2018/0052025 A1* | 2/2018 | Gao ........................ G07C 5/008 |
| 2018/0075344 A1 | 3/2018 | Ma et al. |
| 2018/0144815 A1 | 5/2018 | Chapman-mcquiston et al. |
| 2018/0173961 A1 | 6/2018 | Jain et al. |
| 2018/0173971 A1 | 6/2018 | Jia et al. |
| 2018/0181822 A1 | 6/2018 | Chang et al. |
| 2018/0304716 A1 | 10/2018 | Veca et al. |
| 2019/0065867 A1 | 2/2019 | Huang et al. |
| 2019/0077409 A1 | 3/2019 | Zandi et al. |
| 2019/0147051 A1 | 5/2019 | Lu et al. |
| 2019/0179685 A1 | 6/2019 | Ki |
| 2019/0184916 A1 | 6/2019 | Troia et al. |
| 2019/0187291 A1 | 6/2019 | Troia |
| 2019/0197795 A1 | 6/2019 | Mondello et al. |
| 2019/0205744 A1 | 7/2019 | Mondello et al. |
| 2019/0265764 A1 | 8/2019 | Ping |
| 2019/0286414 A1 | 9/2019 | Langos |
| 2019/0332109 A1 | 10/2019 | Kolouri et al. |
| 2019/0361808 A1 | 11/2019 | Subramanian et al. |
| 2019/0367049 A1 | 12/2019 | Oba |
| 2020/0007672 A1 | 1/2020 | Reyes et al. |
| 2020/0013285 A1 | 1/2020 | Wang |
| 2020/0023846 A1 | 1/2020 | Husain et al. |
| 2020/0062275 A1 | 2/2020 | Higgins et al. |
| 2020/0070657 A1 | 3/2020 | Kim |
| 2020/0134939 A1 | 4/2020 | Schell et al. |
| 2020/0202151 A1 | 6/2020 | Wacquant |
| 2020/0231182 A1 | 7/2020 | Oba |
| 2020/0272815 A1 | 8/2020 | Cao et al. |
| 2020/0285997 A1 | 9/2020 | Bhattacharyya et al. |
| 2020/0369410 A1 | 11/2020 | Rice |
| 2021/0005027 A1 | 1/2021 | Handiaz et al. |
| 2021/0019633 A1 | 1/2021 | Venkatesh |
| 2021/0034048 A1 | 2/2021 | Hajizadeh |
| 2021/0048808 A1 | 2/2021 | Bielby et al. |
| 2021/0048949 A1 | 2/2021 | Kale et al. |
| 2021/0049444 A1 | 2/2021 | Bielby et al. |
| 2021/0049445 A1 | 2/2021 | Bielby et al. |
| 2021/0049457 A1 | 2/2021 | Bielby et al. |
| 2021/0049471 A1 | 2/2021 | Kale et al. |
| 2021/0049479 A1 | 2/2021 | Kale et al. |
| 2021/0049480 A1 | 2/2021 | Kale et al. |
| 2021/0049833 A1 | 2/2021 | Bielby et al. |
| 2021/0049834 A1 | 2/2021 | Kale et al. |
| 2021/0049839 A1 | 2/2021 | Bielby et al. |
| 2021/0052206 A1 | 2/2021 | Kale et al. |
| 2021/0053418 A1 | 2/2021 | Kale et al. |
| 2021/0053574 A1 | 2/2021 | Bielby et al. |
| 2021/0053575 A1 | 2/2021 | Bielby et al. |
| 2021/0055907 A1 | 2/2021 | Bielby et al. |
| 2021/0056315 A1 | 2/2021 | Kale et al. |
| 2021/0056323 A1 | 2/2021 | Pfeiffer et al. |
| 2021/0061027 A1 | 3/2021 | Da Deppo et al. |
| 2021/0064054 A1 | 3/2021 | Bang et al. |
| 2021/0072901 A1 | 3/2021 | Kale et al. |
| 2021/0072911 A1 | 3/2021 | Kale et al. |
| 2021/0072921 A1 | 3/2021 | Bielby et al. |
| 2021/0073063 A1 | 3/2021 | Kale et al. |
| 2021/0073066 A1 | 3/2021 | Bielby et al. |
| 2021/0073127 A1 | 3/2021 | Bielby et al. |
| 2021/0097506 A1 | 4/2021 | Gulati et al. |
| 2021/0147182 A1 | 5/2021 | Cheung et al. |
| 2021/0179117 A1 | 6/2021 | Glazman et al. |
| 2021/0181010 A1 | 6/2021 | Schneider |
| 2021/0222662 A1 | 7/2021 | Do |

* cited by examiner

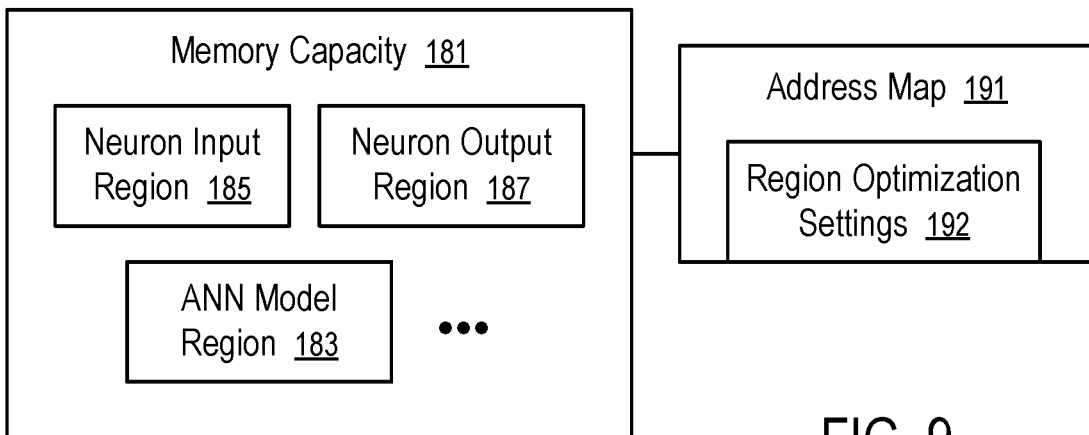
FIG. 9
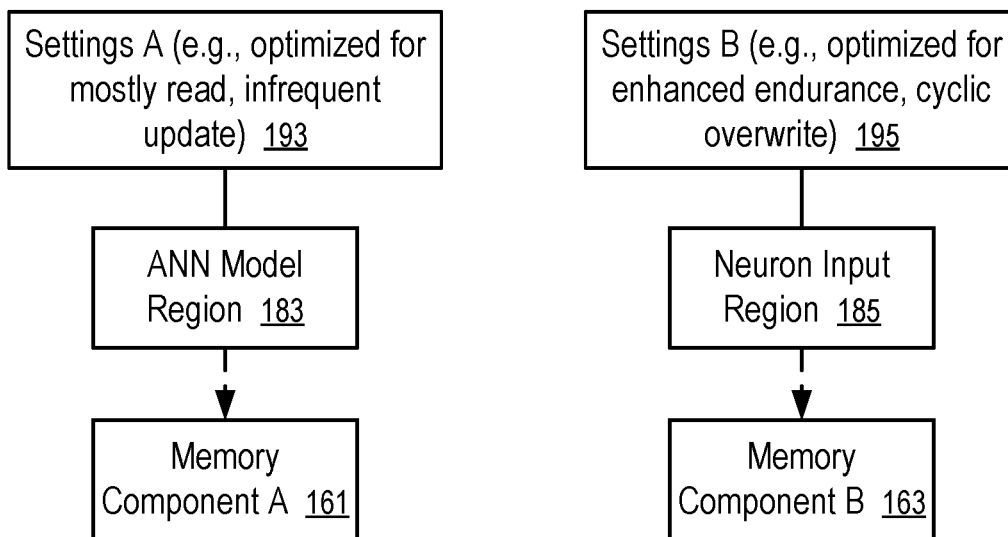
FIG. 10
FIG. 11
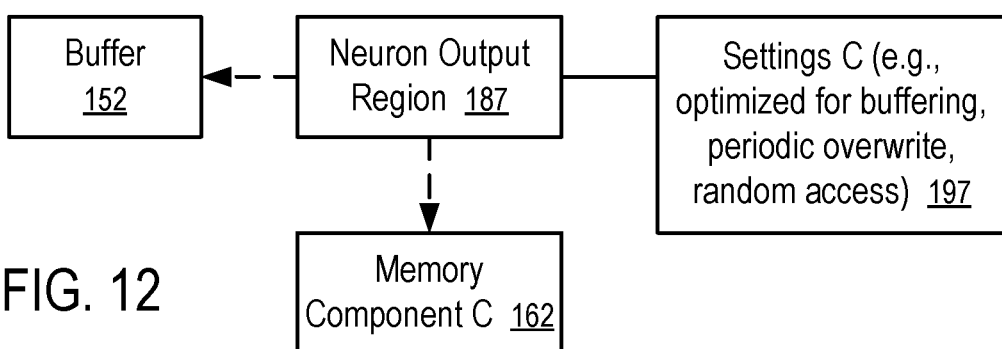
FIG. 12

PREDICTIVE MAINTENANCE OF AUTOMOTIVE TRANSMISSION

FIELD OF THE TECHNOLOGY

At least some embodiments disclosed herein relate to vehicles in general and more particularly, but not limited to, monitoring of automotive transmission systems for predictive maintenance.

BACKGROUND

An automotive transmission is a gearbox that uses gears and gear trains to convert speed and torque between a driving shaft and a driven shaft. Typically, an automotive transmission can last over 150,000 miles, or approximately seven years with typical usages.

However, different driving and/or usage styles can have different impacts on the useful life of an automotive transmission. For example, overheating or failing to maintain the transmission fluid can reduce the life of the transmission. For example, drag racing or stopping abruptly the vehicle can reduce the life of the transmission. For example, using the transmission to hold the vehicle in a parking state without using the parking brake can reduce the life of the transmission. Driving on a bad transmission can be hazardous.

Recent developments in the technological area of autonomous driving allow a computing system to operate, at least under some conditions, control elements of a motor vehicle without the assistance from a human operator of the vehicle.

For example, sensors (e.g., cameras and radars) can be installed on a motor vehicle to detect the conditions of the surroundings of the vehicle traveling on a roadway. A computing system installed on the vehicle analyzes the sensor inputs to identify the conditions and generate control signals or commands for the autonomous adjustments of the direction and/or speed of the vehicle, with or without any input from a human operator of the vehicle.

In some arrangements, when a computing system recognizes a situation where the computing system may not be able to continue operating the vehicle in a safe manner, the computing system alerts the human operator of the vehicle and requests the human operator to take over the control of the vehicle and drive the vehicle manually, instead of allowing the computing system to drive the vehicle autonomously.

Autonomous driving and/or Advanced Driver Assistance System (ADAS) can use an Artificial Neural Network (ANN) for the identification of events and/or objects that are captured in sensor inputs. Examples of sensor inputs include images from digital cameras, lidars, radars, ultrasound sonars, etc.

In general, an Artificial Neural Network (ANN) uses a network of neurons to process inputs to the network and to generate outputs from the network.

For example, each neuron in the network receives a set of inputs. Some of the inputs to a neuron may be the outputs of certain neurons in the network; and some of the inputs to a neuron may be the inputs provided to the neural network. The input/output relations among the neurons in the network represent the neuron connectivity in the network.

For example, each neuron can have a bias, an activation function, and a set of synaptic weights for its inputs respectively. The activation function may be in the form of a step function, a linear function, a log-sigmoid function, etc. Different neurons in the network may have different activation functions.

For example, each neuron can generate a weighted sum of its inputs and its bias and then produce an output that is the function of the weighted sum, computed using the activation function of the neuron.

The relations between the input(s) and the output(s) of an ANN in general are defined by an ANN model that includes the data representing the connectivity of the neurons in the network, as well as the bias, activation function, and synaptic weights of each neuron. Using a given ANN model a computing device computes the output(s) of the network from a given set of inputs to the network.

For example, the inputs to an ANN network may be generated based on camera inputs; and the outputs from the ANN network may be the identification of an item, such as an event or an object.

A Spiking Neural Network (SNN) is a type of ANN that closely mimics natural neural networks. An SNN neuron produces a spike as output when the activation level of the neuron is sufficiently high. The activation level of an SNN neuron mimics the membrane potential of a natural neuron. The outputs/spikes of the SNN neurons can change the activation levels of other neurons that receive the outputs. The current activation level of an SNN neuron as a function of time is typically modeled using a differential equation and considered the state of the SNN neuron. Incoming spikes from other neurons can push the activation level of the neuron higher to reach a threshold for spiking. Once the neuron spikes, its activation level is reset. Before the spiking, the activation level of the SNN neuron can decay over time, as controlled by the differential equation. The element of time in the behavior of SNN neurons makes an SNN suitable for processing spatiotemporal data. The connectivity of SNN is often sparse, which is advantageous in reducing computational workload.

In general, an ANN may be trained using a supervised method where the parameters in the ANN are adjusted to minimize or reduce the error between known outputs resulted from respective inputs and computed outputs generated from applying the inputs to the ANN. Examples of supervised learning/training methods include reinforcement learning, and learning with error correction.

Alternatively, or in combination, an ANN may be trained using an unsupervised method where the exact outputs resulted from a given set of inputs is not known before the completion of the training. The ANN can be trained to classify an item into a plurality of categories, or data points into clusters.

Multiple training algorithms can be employed for a sophisticated machine learning/training paradigm.

BRIEF DESCRIPTION OF THE DRAWINGS

The embodiments are illustrated by way of example and not limitation in the figures of the accompanying drawings in which like references indicate similar elements.

FIG. 9 shows a memory capacity configured to support neural network computations according to one embodiment.

FIG. 10 illustrates the configuration of a memory region for an Artificial Neural Network (ANN) model according to one embodiment.

FIG. 11 illustrates the configuration of a memory region for the inputs to artificial neurons according to one embodiment.

FIG. 12 illustrates the configuration of a memory region for the outputs from artificial neurons according to one embodiment.

DETAILED DESCRIPTION

Figure 1:
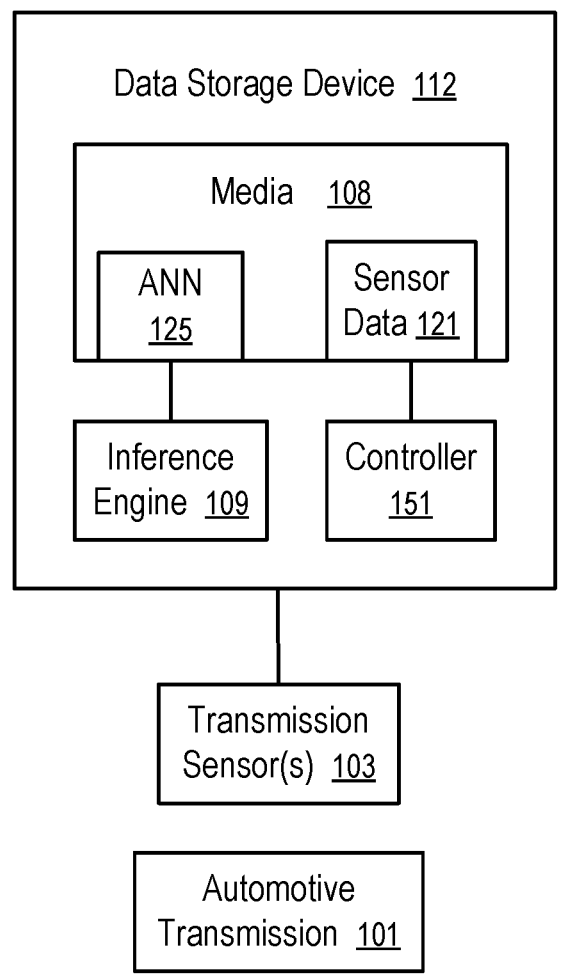
FIG. 1 shows a system to monitor an automotive transmission of a vehicle for preventive maintenance according to one embodiment.

At least some embodiments disclosed herein provide systems, methods and apparatus of predictive maintenance of an automotive transmission of a motor vehicle, or another vehicle, with or without an Advanced Driver Assistance System (ADAS).

In at least some embodiments discussed herein, an artificial neural network is configured to monitor and analyze sensor data generated by sensors configured on an automotive transmission to predict if maintenance or repair would be required.

Sensors can be configured on an automotive transmission to monitor its operating conditions. For example, a temperature sensor can be configured in the transmission to measure the operating temperature of the transmission fluid. For example, a torque sensor can be attached to an input shaft to measure the torque applied on the input shaft; alternatively, in combination, a torque sensor can be applied to the output shaft to measure the torque passed by the transmission to the output shaft. For example, a vibration sensor can be configured in the transmission fluid to monitor the motions in the transmission fluid. For example, a microphone can be attached to the gearbox to monitor the noises generated by the automotive transmission.

The artificial neural network can be trained to recognize common transmission problems from the sensor data and/or predict the need for transmission maintenance. The artificial neural network can be trained to determine whether the sensor data has a normal pattern, or an abnormal pattern that is known to not require immediate intervention, or an abnormal pattern that is known to require immediate intervention.

Based on the classification of the sensor data determined by the artificial neural network, the vehicle can be configured to alert the driver/passenger about anomaly, and/or cause an autonomous driving system or advanced driver assistance system to slow and/or stop the vehicle safely.

When the artificial neural network classifies a set of sensor data of the transmission as abnormal, the sensor data having the abnormal pattern can be stored in a data storage device automatically for subsequent diagnosis in a maintenance facility. Alternatively, or in combination, the abnormal sensor data can be transmitted to a server via a wireless connection from the vehicle for diagnosis. Sensor data having recognized normal patterns can be discarded to reduce the need for a large storage capacity.

When a diagnosis result is available in the maintenance facility, the artificial neural network (or another artificial neural network) can be further trained to predict the diagnosis result from the sensor data having the abnormal pattern stored in and/or downloaded from the data storage device.

Early detection of transmission damage or failure can result in lower cost in repair, and potentially avert a catastrophic incident.

For example, the sensor data from the transmission and/or other sensor data and/or operation parameters of the vehicle can be provided as an input data stream to a data storage device. The data storage device records the input data stream in an input region cyclically to keep the most recent segment of the input data stream. During a period of time in which the transmission is expected to function normally, the sensor data identifies normal patterns. An Artificial Neural Network (ANN) (e.g., a Spiking Neural Network (SNN)) in the data storage device can be trained to recognize the normal patterns in the sensor data stored in to the input region. After the training, the data storage device can be switched to a prediction mode in which the trained ANN is used to determine whether the current sensor data in the input region has the normal patterns recognized from the training period.

When a suspected errant behavior is detected, the controller of the data storage device can prevent the recorded sensor data to be erased or discarded (e.g., by saving the data into a separate output region, partition and/or to the cloud). Further, the computer system of the vehicle can generate an alert for the driver, the owner and/or a maintenance facility about the suspected errant behavior.

After investigation or diagnosis in a maintenance facility, the data can be labeled as normal or errant and thus used to further train the artificial neural network (e.g., SNN) for improved future detections.

When a problem in the automotive transmission is diagnosed after a maintenance visit, the diagnosis and the recorded data can be used to train an artificial neural network to recognize the defect from similar data. This artificial neural network can be configured on a server to remotely diagnose problems of automotive transmissions when vehicles uploads their abnormal sensor data to the server. Alternatively, this artificial neural network can be downloaded into vehicles in the field through over the air updates to allow the vehicles to generate diagnosis results from abnormal sensor data.

Optionally, the sensor data provided to the data storage device for the training of the ANN and/or for the prediction of a need for maintenance services can further include data representing the operating condition of the vehicle, such as the environmental temperature of the vehicle, a speed of the vehicle, a location of the vehicle, a roadway on which the vehicle is traveling, inputs from other sensors of the vehicle, inference results generated based on the inputs from some of the sensors, status of the components of the vehicle, such as the throttle, the brake, the steering mechanism, the infotainment system, and/or the communication device of the vehicle.

FIG. 1 shows a system to monitor an automotive transmission of a vehicle for preventive maintenance according to one embodiment.

In FIG. 1, an automotive transmission (101) is configured with one or more sensors (103) that determine the working condition of the automotive transmission (101).

For example, the sensor(s) (103) of the transmission can include one or more temperature sensor configured in the transmission fluid. The temperature measurement from the sensor(s) (103) identifies the operating temperature of the gears and gear trains in the transmission.

For example, the sensor(s) (103) of the transmission can include one or more strain or stress sensors attached to one or more shafts of the transmission to measure the torques in the shaft(s). The measured torques indicate working conditions of the transmission.

For example, a vibration sensor or microphone can be configured in the transmission fluid to measure the vibrations in the transmission fluid.

For example, a vibration sensor or microphone can be configured on a case of the transmission to monitor the noises generated by the automotive transmission.

In FIG. 1, the sensed inputs from the transmission sensor(s) (103) and/or the other input data (e.g., from a computer system of the vehicle) are communicated to a data storage device (112).

The data storage device (112) has a media (108) configured to store the sensor data (121) from the transmission sensor(s) (103). A controller (151) of the data storage device (112) can store the sensor data (121) in an input region, partition or namespace in a cyclic way, such that the most recent set of sensor data (121) is available in the data storage device (112).

The data storage device (112) includes an inference engine (109) that can analyze the sensor data (121) using an ANN (125) configured in the data storage device (112). The ANN (125) is configured to classify the sensor data (121) as normal, or abnormal. Abnormal sensor data (121) can be further classified as unknown abnormal sensor data, abnormal sensor data known to require immediate intervention, and abnormal sensor data known to not require immediate intervention.

For example, during a period of time in which the automotive transmission of the vehicle is assumed to have normal operations, the sensor data (121) collected in the data storage device (112) can be used to train the ANN (125) to recognize normal patterns of the sensor data (121).

For example, within a predetermined time period from the vehicle leaving a manufacturer, the vehicle can be assumed to have normal operations. For example, when operated within a predetermined amount of initial mileages of the vehicle, the automotive transmission of the vehicle can be assumed to have normal operations.

Subsequent, as the likelihood of the vehicle having abnormal operations increases, the inference engine (109) is configured to use the ANN (125) to determine whether the current sensor data (121) deviates from the recognized normal patterns. When a new or abnormal pattern is detected, the data storage device (112) can generate an alert for a maintenance service. After the maintenance service, the new or abnormal pattern can be labeled as normal, abnormal sensor data known to require immediate intervention, or abnormal sensor data known to not require immediate intervention; and the ANN (125) can be further trained to predict the label from the sensor data (121) having the new pattern.

Figure 2:
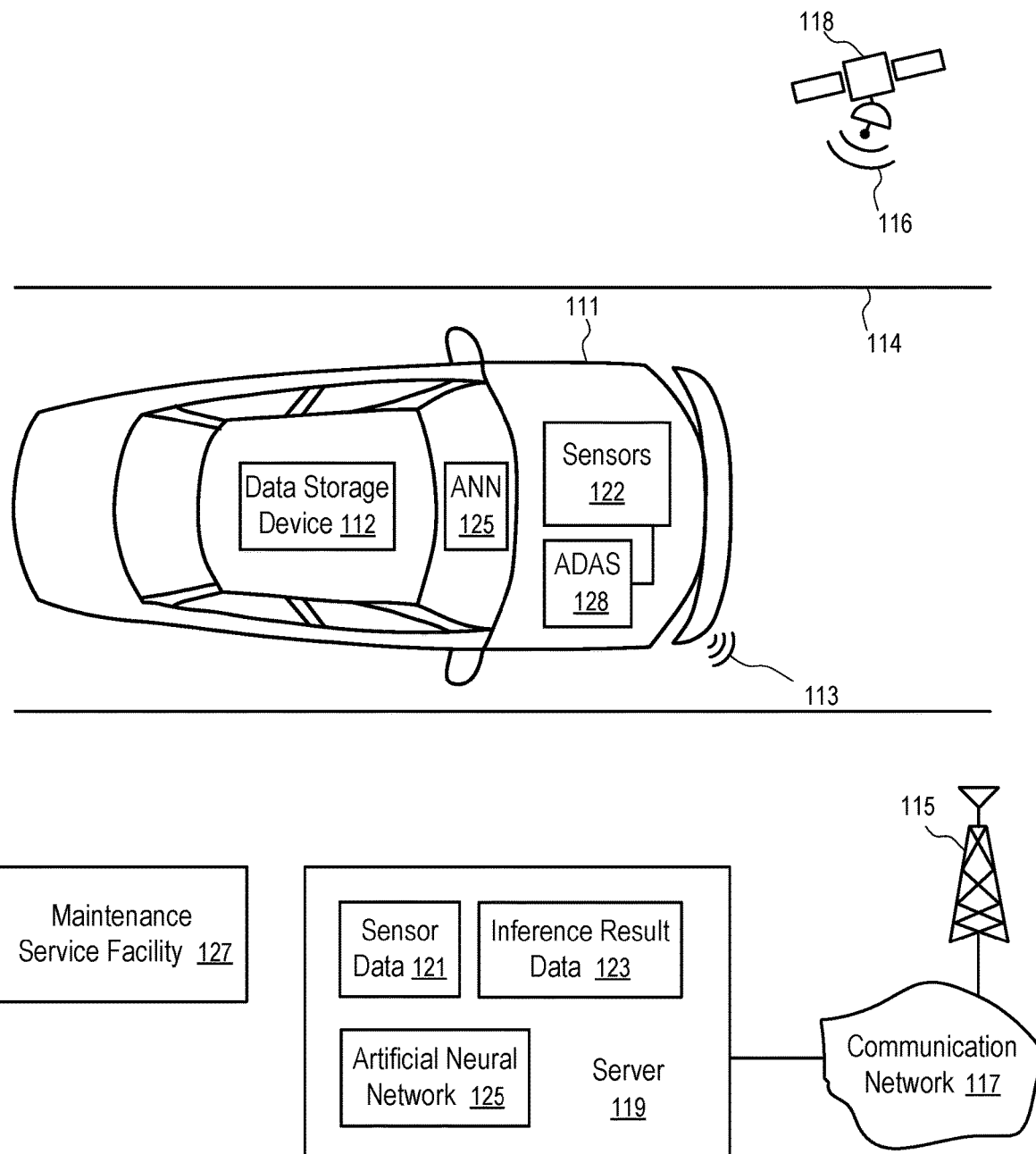
FIG. 2 shows a system having a vehicle configured to collect and process sensor data according to some embodiments.

For example, the data storage device (112) can be configured in a vehicle illustrated in FIG. 2. The inference engine (109) can train the ANN (125) to recognize normal patterns of sensor data (121) collected during a period of time in which the likelihood of the automotive transmission having normal operations is predetermined to be above a threshold. Subsequently, the inference engine (109) can use the ANN (125) determine whether the current sensor data (121) from the sensors and the control units has the normal patterns; and when the current sensor data (121) does not have the normal patterns, the vehicle can present an alert for a maintenance visit.

FIG. 2 shows a system having a vehicle (111) configured to collect and process sensor data according to some embodiments.

The vehicle (111) in FIG. 2 has a data storage device (112), sensors (122), an ANN (125), and an ADAS (128) configured to process sensor data, including inputs from the sensors (122), to generate control signals for the vehicle (111).

For example, the sensors (122) can include the sensors (103) of the automotive transmission (101) illustrated in FIG. 1.

In general, one or more sensors (e.g., 122) can be configured on the vehicle (111) to generate senor data input to the ADAS (128) and/or the data storage device (112). The data storage device (112) and/or the ADAS (128) can be configured to use the ANN (125) to generate inference results. The inference results can include a control signal for operating or driving the vehicle (111), a suggestion for a maintenance service of the vehicle (111), etc.

In some implementations, at least a portion of the data generate by the sensors (e.g., 122) is used in both the ADAS (128) for driver assistance and in the ANN (125) for maintenance prediction. Optionally, the output of the ANN (125) can be used in both the data storage device (112) and in the ADAS (128). The ANN (125) can be part of the ADAS (128).

Some of the sensors (122) can be configured in a digital camera, lidar, radar, ultrasound sonar, etc. Other types of sensors can also be used, such as brake sensors, speed sensors, acceleration sensors, airbag sensors, a GPS (global positioning system) receiver, audio sensors/microphones, vibration sensors, force/stress sensors, deformation sensors, motion sensors, temperature sensors, etc. Some of the sensors (122) can be configured primarily to monitor the environment of the vehicle (111); and other sensors (122) can be configured primarily to monitor the operating condition of one or more component of the vehicle (111), such as an internal combustion engine, an exhaust system, an electric motor, a brake, a tire, a battery, etc.

The ANN (125) of the vehicle (111) is configured to process the sensor input data from the sensors (122) to control the vehicle (111) and/or the data storage device (112), and/or generate alerts for maintenance services.

In general, the outputs of the sensor(s) (122) as a function of time are provided as a sensor data stream to the ADAS (128) and/or the ANN (125) to provide driver assistance (e.g., autonomous driving) and maintenance prediction.

At least a portion of the sensor data stream can be provided to the data storage device (112) for storing and/or for processing. For example, a portion of the ANN (125) can be implemented in the data storage device (112). The inference engine (109) of the data storage device (112) can process the sensor data stream to generate inference results for further processing by the ADAS (128). Thus, the input data stream to the data storage device (112) can include at least a portion of the sensor data stream from the sensors (122); and the output data stream can include inference results generated using the ANN (125) in the data storage device (112) for the ADAS (128) of the vehicle (111). The operating condition of the vehicle (111) and thus the workload of the data storage device (112) can be determined from the patterns in the input/output data streams of the data storage device (112).

The ANN (125) of the vehicle (111) and/or in the data storage device (112) can include an SNN configured to classify time-based variations of sensor data and/or detect deviation from known patterns of sensor data of the vehicle (111). When the ANN (125) detects the deviation from known patterns, the sensor data corresponding to the deviation can be stored in the data storage device (112) for further analysis and/or for further training of the ANN (125).

The data storage device (112) of the vehicle (111) can be configured to record sensor data for a period of time. The recorded sensor data can be used in the ANN (125) for predictive maintenance and/or used to further train the ANN (125). The maintenance service facility (e.g., 127) can download the sensor data (121) from the data storage device (112) and provide the sensor data (121) and the corresponding inference result data (123) to the server (119) to facilitate the training of the ANN (125).

Optionally, or in combination, the data storage device (112) is configured with a machine learning module to customize and/or train the ANN (125) installed in the vehicle (111) and/or in the data storage device (112).

The vehicle (111) can have a wireless communication device to communicate with a remote server (119) via wireless signals (113) and a communication network (117). The remote server (119) is typically configured at a location away from a road (114) on which the vehicle (111) is in service. For example, the vehicle (111) may provide some sensor data (121) to the server (119) and receive update of the ANN (125) from the server (119).

The communication network (117) can be a cellular phone network having one or more base stations (e.g., 115) to receive the wireless signals (e.g., 113). Alternatively, or in combination, the communication network (117) can include the Internet, where the wireless local area network signals (e.g., 113) transmitted by the vehicle (111) is received in an access point (e.g., 115) for further communication to the server (119). In some implementations, the vehicle (111) uses a communication link (116) to a satellite (118) or a communication balloon to communicate with the server (119).

The server (119) can also communicate with one or more maintenance service facilities (e.g., 127) to receive the sensor data (121) and/or the desired inference result data (123) of vehicles (e.g., 111).

For example, the desired inference result data (123) can be generated by a human operator inspecting the sensor data (121) (e.g., images from the sensors (122)) and/or relevant conditions of the vehicle (111). For example, the desired inference result data (123) can include inspection records and/or service records of components of the vehicles (e.g., 111). For example, the inspection records and/or service records can indicate the degree of wear and tear of components inspected during their services at the maintenance service facilities (e.g., 127), the identification of failed or malfunctioning components, etc. The sensor data (121) of the vehicles (e.g., 111) obtained in a time period relevant to the desired inference result data (123) can be used to train an ANN (125) at the server (119) to improve inference capability of the ANN (125).

The updated ANN (125) can be installed in the vehicle (111) at the maintenance service facility (127). Alternatively, the update ANN (125) can be transmitted to the vehicle (111) to update the vehicle (111) over the air.

A portion of the ANN (125) responsible for the processing of input from the sensors (122) can be configured in the data storage device (112). The inference engine (109) of the data storage device (112) processes the inputs from the sensors (122) to generate the inference results transmitted from the data storage device (112) to the ADAS (128). Based on the input from the sensors (122) and/or the inference results to the ADAS (128), the inference engine (109) of the data storage device (112) can generate inference results to optimize the performance of the data storage device (112) in processing the input data stream and the output data stream, by adjusting the operations of buffering/caching, garbage collection, wear leveling, etc.

Figure 3:
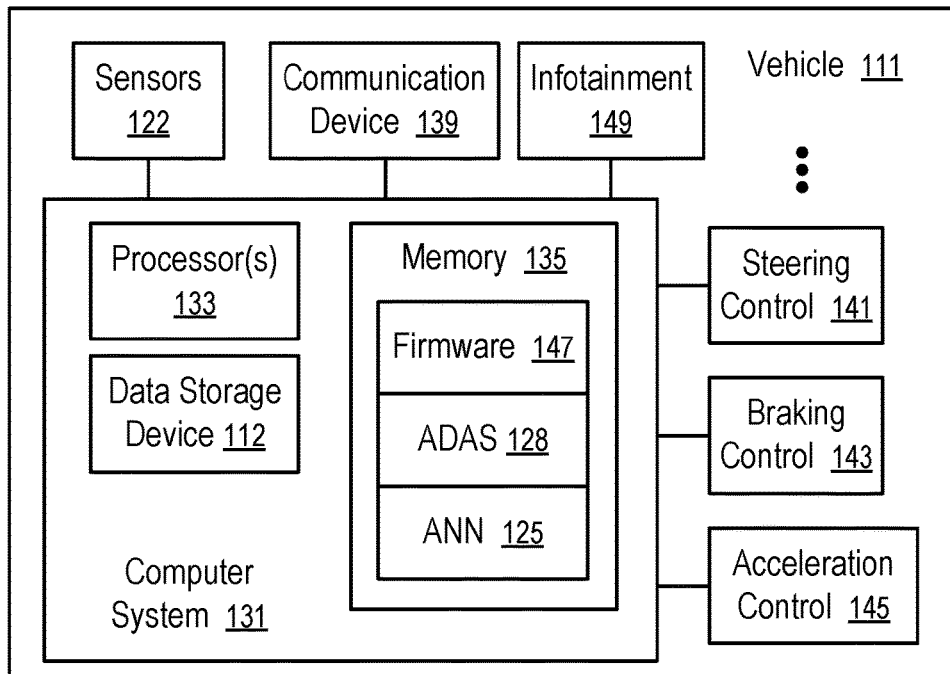
FIG. 3 shows an autonomous vehicle according to one embodiment.

FIG. 3 shows an autonomous vehicle (111) according to one embodiment. For example, the vehicle (111) in the system of FIG. 2 can be implemented using the autonomous vehicle (111) of FIG. 3.

In general, the vehicle (111) can include an infotainment system (149), a communication device (139), one or more sensors (122), and a computer system (131) that is connected to some controls of the vehicle (111), such as a steering control (141) for the direction of the vehicle (111), a braking control (143) for stopping of the vehicle (111), an acceleration control (145) for the speed of the vehicle (111), etc. In some embodiments, the vehicle (111) in the system of FIG. 2 has a similar configuration and/or similar components.

The vehicle (111) of FIG. 3 is configured with an Advanced Driver Assistance System (ADAS) (128). The ADAS (128) of the vehicle (111) can have an Artificial Neural Network (ANN) (125) for object detection, recognition, identification, and/or classification, based on images generated in the sensors (122). A portion of the ANN (125) can be implemented in the data storage device (112) of FIG. 1.

The computer system (131) of the vehicle (111) can include one or more processors (133), a data storage device (112), and memory (135) storing firmware (or software) (147), including the computer instructions and data models for ADAS (128).

Sensors (122) of the vehicle (111) can include a visible light camera, an infrared camera, a lidar, radar, or sonar system, a peripheral sensor, a Global Positioning System (GPS) receiver, a satellite positioning system receiver, a brake sensor, and/or an airbag sensor. Further, the sensors (122) of the vehicle (111) can include audio sensors (e.g., microphone) configured to monitor noises from various components and locations in the vehicle (111), a vibration sensor, a pressure sensor, a force sensor, a stress sensor, and/or a deformation sensor configured to measure loads on a component of the vehicle (111), accelerometers and/or gyroscope sensors measuring the motions of some components of the vehicle (111), etc. Such sensors can be used to monitor the operating status and/or health of the components for predictive maintenance.

The sensors (122) can provide a stream of real time sensor data to the computer system (131). The sensor data generated by sensors (122) of the vehicle (111) can include an image that captures an object using a camera that images using lights visible to human eyes, or a camera that images using infrared lights, or a sonar, radar, or LIDAR system. Preferably, the image is processed by the inference engine (109) of the data storage device (112) to generate inference results as the output data stream of the data storage device (112) and thus reduce the computation workload of the main computer system (131).

For example, a camera can be used to obtain roadway information for the travel of the vehicle (111), which can be processed by the ANN (125) to generate control signals for the vehicle (111). For example, a camera can be used to monitor the operation state/health of a component of the vehicle (111), which can be processed by the ANN (125) to predict or schedule a maintenance service.

The infotainment system (149) of the vehicle (111) can be used to present data and/or inference results from the sensors (122). For example, compressed images with reduced resolution and refreshing frequency can be generated in the sensors (122) and transmitted to the infotainment system (149) for presentation to an occupant of the vehicle (111). Optionally, the communication device (139) can establish a connection to a mobile device of an occupant of the vehicle (111) to make the presentation.

When the vehicle (111) is configured with an ADAS (128), the outputs of the ADAS (128) can be used to control the acceleration of the vehicle (111), the speed of the vehicle (111), and/or the direction of the vehicle (111), during autonomous driving.

Figure 4:
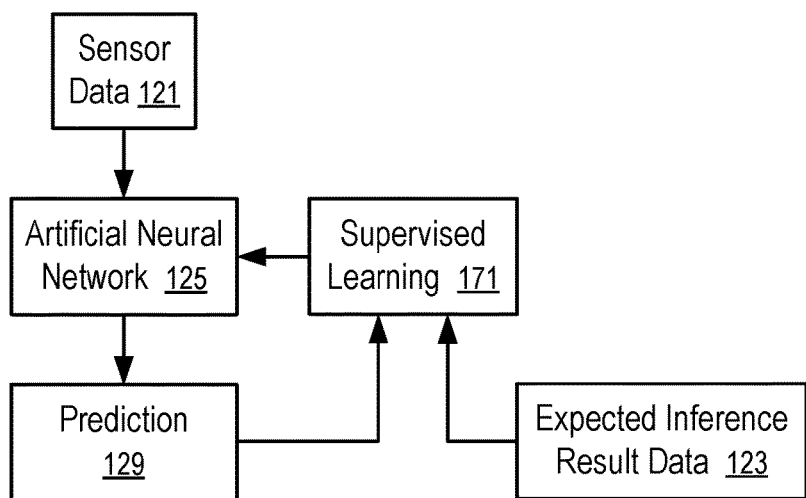
FIGS. 4-6 illustrate training of artificial neural networks for prediction according to some embodiments.
Figure 5:
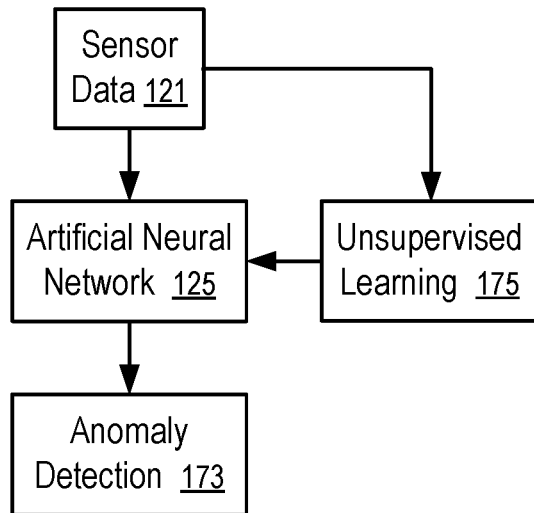
Figure 6:
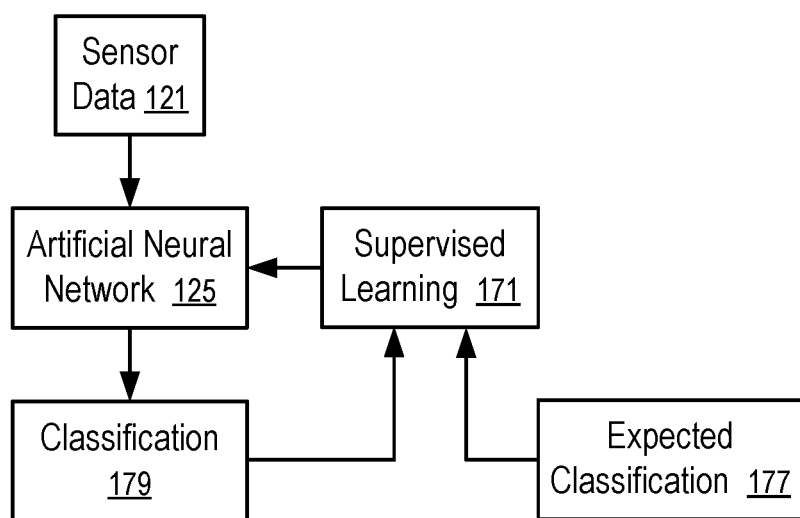

FIGS. 4-6 illustrate training of artificial neural networks (125) for prediction according to some embodiments.

In FIG. 4, a module (171) of supervised machine learning is used to train an artificial neural network (125) to minimize the differences between the prediction (129) generated from the sensor data (121) and the desired inference result data (123).

For example, the sensor data (121) can include an image showing an object; and the desired/expected inference result data (123) can identify an image region occupied by the object, a feature of the object, a classification of the object, an identity of the object, etc.

For example, the sensor data (121) can include an image surrounding of the vehicle (111); and the desired/expected inference result data (123) can include preferred control inputs for the steering control, the braking control, and the acceleration control.

The desired/expected inference result data (123) can be generated by a human operator. For example, the sensor data (121) can be used to construct a virtual reality demonstration of a situation encountered by the vehicle (111), including images from the sensors (122) showing an environment of the vehicle (111); and the desired/expected inference result data (123) can include responses generated by a human operator responsive to the virtual reality demonstration of the situation.

The supervised machine learning module (171) can adjust the artificial neural network (125) to reduce/minimize the difference between the prediction (129) generated based on the sensor data (121) and the desired/expected inference result data (123) generated by a human operator.

The supervised learning (171) of FIG. 4 can be applied in the server (119) based on the sensor data of a population of vehicles and corresponding desired/expected inference result data (123) to generate a generic ANN for the population of the vehicles.

The supervised learning (171) of FIG. 4 can be applied in the vehicle (111) based on the sensor data of the vehicle and inference result data (123) to generate a customized/personalized ANN (125). For example, a generic ANN (125) can be initially used in the vehicle (111); and the sensor data of the vehicle (111) and desired/expected inference result data (123) specific to the vehicle (111) can be used to further train the ANN (125) of the vehicle for customization/personalization of the ANN (125) in the vehicle (111).

In FIG. 5, a module (175) of unsupervised machine learning is used to train or refine an artificial neural network (125) to facilitate anomaly detection (173). The unsupervised machine learning module (175) is configured to adjust the ANN (e.g., SNN) to generate the normal classification, clustering, or recognized patterns in the sensor data (121) such that a degree of deviation from the normal classification, clustering, or recognized patterns in the sensor data (121) can be used to signal the detection (173) of anomaly.

For example, anomaly detection (173) can be used to preserve the sensor data (121) associated with anomaly for further analysis. In response to anomaly detection (173) in the vehicle (111), the computer system (131) can issue read command to the sensors (122) to retrieve image data associated with the anomaly from the sensors (122) and store the retrieved image data in the data storage device (112). The image data associated with the anomaly can be temporarily preserved in the memory device of the sensors (122) and loaded to the data storage device (112) over a period of time using available communication bandwidth between the sensors (122) and the data storage device (112) without impacting the normal operations of the ADAS (128).

When the vehicle (111) is in the maintenance service facility (127), the image data (and other sensor data) associated with the anomaly can be retrieved from the data storage device (112) to generate desired/expected inference result data (123) for further training of the ANN (125) using a supervised learning (171) of FIG. 4.

Optionally, a supervised machine learning (171) can be used to train the ANN (125), as illustrated in FIG. 6. The supervised learning (171) can be used to minimize the classification differences between the predictions (179) made using the ANN (125) according to the sensor data (121) and the expected classification (177).

For example, in absence of an accident, a near accident event, or a user input indicating an abnormal condition, a classification of "normal" can be assumed. An accident, a near accident event, or a user input can be used to identify an expected classification of "abnormal" for the sensor data leading to the accident, event, or user input. The supervised machine learning (171) can be used to train the artificial neural network (125) to make the classification (179) with reduced/minimized differences from the expected classification (177).

Optionally, the inference engine (109) of the data storage device (112) can be configured to accelerate the computations of a portion of the artificial neural network (ANN) (125) implemented in the data storage device (112).

For example, the inference engine (109) can include a neural network accelerator (159) specialized to perform at least part of the computations involving the artificial neural network (ANN) (125), such as dot-product of vectors and tensors, multiply and accumulation operations, etc.

Figure 7:
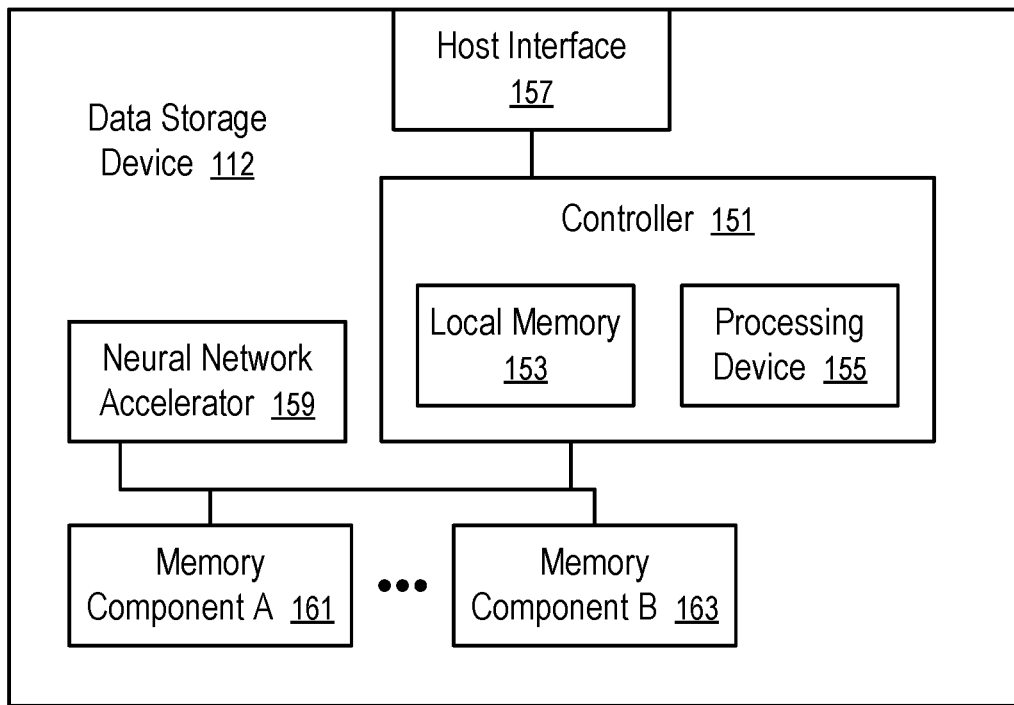
FIG. 7 shows a data storage device with a neural network accelerator according to one embodiment.

FIG. 7 shows a data storage device (112) with a neural network accelerator (159) according to one embodiment. For example, the data storage device (112) of FIG. 7 can be used in the vehicle (111) illustrated in FIG. 2 or 3.

In FIG. 7, the data storage device (112) has a host interface (157) configured to communicate with a host processor (e.g., 133 in FIG. 3). For example, the communication between the host processor (e.g., 133) and the host interface (157) can be, at least in part, in accordance with a communication protocol for a Peripheral Component Interconnect express (PCIe) bus, a Serial Advanced Technology Attachment (SATA) bus, a Universal Serial Bus (USB) bus, and/or a Storage Area Network (SAN).

For example, the host computer system (131) can communicate with the host interface (157) to retrieve inference results generated by the data storage device (112) from the input data stream that contains sensor data generated by the sensors (122) of the vehicle (111).

For example, the host interface (157) can be used to receive, from the sensors (122), sensor data (121) of the vehicle (111); and the sensor data (121) can be optionally stored in the data storage device (112) for an analysis of a subsequent accident or near accident event.

In FIG. 7, each of the memory components (161 to 163) can be a memory integrated circuit configured to store data.

The neural network accelerator (159) and the controller (151) can be implemented via logic circuits formed on one or more integrated circuit dies that are stacked on the integrated circuit dies of the memory components (161 to 163). Through-silicon vias between the integrated circuit die(s) of the neural network accelerator (159) and the controller (151) and the integrated circuit dies of the memory components (161 to 163) can be used to provide high communication bandwidth for processing the data stored in the memory components (161 to 163) to generate inference results. The inference results can be stored in the local memory (153) of the controller (151) and/or some of the memory components (161 to 163) for retrieval by the host system, such as the computer system (131) of the vehicle (111). For example, different memory components (161 to 163), or different sections of a memory component (e.g., 161 or 163), can use through-silicon vias to facilitate parallel access for different portions of the neural network accelerator (159), and the controller (151).

In general, some memory integrated circuits are volatile and require power to maintain the stored data; and some memory integrated circuits are non-volatile and can retain the stored data even when not powered. The memory components (161 to 163) can include volatile memory and/or non-volatile memory. The memory components (161 to 163) can implement different types of memory or a same type of memory.

Examples of non-volatile memory include flash memory, memory units formed based on negative-and (NAND) logic gates, negative-or (NOR) logic gates, Phase-Change Memory (PCM), magnetic memory (MRAM), resistive random-access memory, cross point storage and memory devices. A cross point memory device can use transistor-less memory elements, each of which has a memory cell and a selector that are stacked together as a column. Memory element columns are connected via two lays of wires running in perpendicular directions, where wires of one lay run in one direction in the layer is located above the memory element columns, and wires of the other lay is in another direction and in the layer located below the memory element columns. Each memory element can be individually selected at a cross point of one wire on each of the two layers. Cross point memory devices are fast and non-volatile and can be used as a unified memory pool for processing and storage. Further examples of non-volatile memory include Read-Only Memory (ROM), Programmable Read-Only Memory (PROM), Erasable Programmable Read-Only Memory (EPROM) and Electronically Erasable Programmable Read-Only Memory (EEPROM) memory, etc. Examples of volatile memory include Dynamic Random-Access Memory (DRAM) and Static Random-Access Memory (SRAM).

The data storage device (112) can have a controller (151) that includes volatile local memory (153) and at least one processing device (155).

The local memory of the controller (151) can be an embedded memory configured to store instructions for performing various processes, operations, logic flows, and routines that control operation of the processing device (155), including handling communications between the data storage device (112) and the processor(s) (e.g., 133) of the vehicle (111), and other functions described herein. Optionally, the local memory (151) of the controller (153) can include Read-Only Memory (ROM) for storing micro-code and/or memory registers storing, e.g., memory pointers, fetched data, etc., and/or volatile memory, such as Dynamic Random-Access Memory (DRAM) and Static Random-Access Memory (SRAM).

In FIG. 7, the data storage device (112) includes a neural network accelerator (159) coupled to the controller (151) and/or the memory components (161 to 163).

For example, the neural network accelerator (159) can be configured to perform matrix arithmetic computations more efficiently than the processing device (155) of the controller (151). The computations involving ANN (125) have matrix multiplication and accumulation operations, which can be computationally intensive for a generic processor (e.g., 133, 155). Using the neural network accelerator (159) to perform the matrix arithmetic computations can reduce the data to be transmitted to the processor(s) (133) of the vehicle (111) and reduce the computation workload for the processor(s) (133, 155).

When the ANN (125) includes a Spiking Neural Network (SNN), the simulation of the differential equation(s) for controlling the activation level of SNN neurons can be computationally intensive for a generic processor (e.g., 133, 155). Optionally, the neural network accelerator (159) can use special hardware to simulate the differential equation(s) and thus improve the computational efficiency in implementing the SNN.

In some implementations, the neural network accelerator (159) is an integrated circuit device separate from the controller (151) and/or the memory components (161 to 163). Alternatively, or in combination, a neural network accelerator (159) is integrated with the controller (151) in an integrated circuit die. Alternatively, or in combination, a portion of the neural network accelerator (159) can be integrated on the integrated circuit die(s) of at least one of the memory components (161 to 163), as illustrated in FIG. 8.

Figure 8:
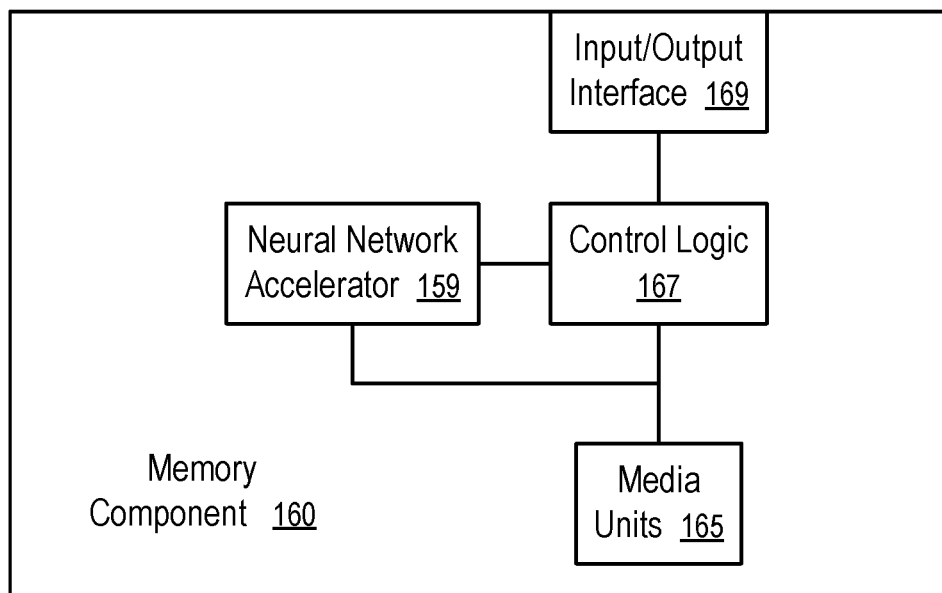
FIG. 8 shows a memory component to accelerate neural network computations according to one embodiment.

FIG. 8 shows a memory component (160) to accelerate neural network computations according to one embodiment. For example, each or some of the memory components (161 to 163) in FIG. 7 can be implemented using a memory component (160) of FIG. 8.

In FIG. 8, the memory component (160) can be formed on an integrated circuit die. An input/output (I/O) interface (169) of the memory component (160) is configured to process input/output signals for the memory component (160). For example, the input/output signals can include address signals to specify locations in the media units (165) and data signals representing data to be written in the media units (165) at the locations specified via the address signals, or data retrieved from the locations in the media units (165).

In FIG. 8, a neural network accelerator (159) is coupled with the control logic (167) and/or the media units (165) to perform computations that are used in the evaluation of the output of a portion of an ANN (125) and/or in the training of the ANN (125).

For example, the input/output interface (169) can receive addresses that identify matrices that are stored in the media units and that are to be operated upon via the neural network accelerator (159). The memory component (160) can provide the computation results of the neural network accelerator (159) as the output data responsive to the addresses, store the output data in a buffer for further operations, store the output data into a location in the media units (165) specified via the address signals. Thus, the computations performed by the neural network accelerator (159) can be within the memory component (160), which is close to the media units (165) in which the matrix data is stored.

For example, the state data of SNN neurons can be stored in the media units (165) according to a predetermined pattern. The neural network accelerator (159) can automatically update the states of the SNN neurons according to the differential equation(s) for controlling the activation level of SNN neurons over time. Optionally, the neural network accelerator (159) is configured to process spiking of neurons in the neural network. Alternatively, the neural network accelerator (159) of the data storage device (112) and/or the processor(s) (133) can be configured to process the spiking of neurons and/or accumulation of inputs to the SNN.

For example, the sensors (122) generate sensor data (e.g., images) at a predetermined frequency. Each image is stored into the memory components (161 to 163) in a cyclic way where the newest image writes over the oldest image. The memory components (161 to 163) further store a portion of ANN (125) of the vehicle (111) responsible for processing of the images from the sensors (122). The controller (151) processes the images in the memory components (161 to 163) according to the portion of ANN (125) to generate inference results. The inference results are stored in the memory components (161 to 163) and/or in the local memory (153) of the controller (151) for reading by the host system, such as the computer system (131) of the vehicle (111).

For example, the data storage device (112) receives a sensor data stream from at least one sensor (122) configured on the vehicle (111) and generate the inference results based on the sensor data stream according to the portion of ANN (125) stored in the memory components (161 to 163). A neural network accelerator (159) configured within the data storage device (112) performs at least a portion of computations based on an artificial neural network (125) and the sensor data stream.

Optionally, the neural network accelerator (159) can be configured on an integrated circuit die that is separate from a controller (151) and/or separate from the memory components (161 to 163).

Optionally, the neural network accelerator (159) can be configured on an integrated circuit die that includes a controller (151) of the data storage device (112), or memory component (160, 161 or 163) of the data storage device (112).

The neural network accelerator (159) can be configured to perform computations, such as matrix arithmetic computations for ANN and/or or differential equation simulations for SNN, using data stored in the data storage device (112).

Examples of the matrix arithmetic computations include matrix multiplication and accumulation operations. After a computation to generate a result of the matrix arithmetic computations using a data stored in the data storage device (112), the neural network accelerator (159) can provide the result as output of the data storage device (112) in data retrieval operations (e.g., in response to a read command). Alternatively, or in combination, the result of the matrix arithmetic computation can be buffered in the data storage device (112) as operand for a next matrix computation performed in combination with a matrix of data retrieved from the non-volatile memory via a read command received in the host interface (157).

When the Artificial Neural Network (ANN) (125) includes a Spiking Neural Network (SNN), the neural network accelerator (159) can be configured to simulate a differential equation controlling activation levels of neurons in the Spiking Neural Network (SNN). Optionally, the memory component (160) is configured to store states of the neurons in the spiking neural network according to a predetermined pattern; and the neural network accelerator is configured to automatically update the states of the neurons over time according to the differential equation. For example, the neural network accelerator (159) can be configured to train the Spiking Neural Network (SNN) via unsupervised machine learning to detect anomaly.

The computations performed by the neural network accelerator (159) according to an Artificial Neural Network (ANN) (125) involve different types of data that have different patterns of usages of the data storage device (112).

For example, making a prediction using the Artificial Neural Network (ANN) (125) includes the use of data specifying the model of the Artificial Neural Network (ANN) (125), input data provided to the artificial neurons, and output data generated by the artificial neurons.

The memory capacity of the data storage device (112) can be partitioned into different portions for the different types of ANN-related data. The different portions can be separately configured to optimize the access and storage of the corresponding data according to their patterns of usages by the neural network accelerator (159) and/or the processor(s) (133) of the computer system (131) in which the data storage device (112) is configured.

The model of the Artificial Neural Network (ANN) (125) can include the parameters specifying the static attributes of individual artificial neurons in the ANN (125) and the neuron connectivity in the ANN (125). The model data of the ANN (125) is static and does not change during the prediction calculation made using the ANN (125). Thus, the usage pattern of the model data is mostly read. However, the model data of the ANN (125) can change when an updated ANN (125) is installed. For example, the vehicle (111) can download an updated ANN (125) from the server (119) to the data storage device (112) of the vehicle (111) to update its prediction capability. The model data of the ANN (125) can also change during or after the training of the ANN (125) using a machine learning technique (e.g., 171 or 175). It is preferred to configure a memory separate partition or region of the data storage device (112) to store the model data, where the partition or region is operated according to configuration parameters that optimize the memory units for the specific usage patterns of the model data (e.g., mostly read, infrequent update). For example, when the memory units are implemented using a flash memory based on NAND logic gates, the memory units in the ANN model partition/region can be configured to operate in a Multi-Level Cell (MLC) mode, a Triple Level Cell (TLC) mode, or a Quad-Level Cell (QLC) mode, wherein each memory cells stores two, three, or four bits for increased storage capability.

Input data provided to the artificial neurons in the ANN (125) can include external inputs and internal inputs. The external inputs are generated typically by the sensors (e.g., 122) of the vehicle (111) but not by artificial neurons in the ANN (125). The external inputs can be saved in a cyclic fashion so that the input data of the most recent time period of a predetermined length of driving can be found in the data storage device (112). Thus, it is preferred to configure a separate memory partition or region of the data storage device (112) to store the external input data, where the partition or region is operated according to configuration parameters that optimize the memory units for the storage pattern of the external input data (e.g., enhanced endurance, cyclic overwrite). For example, when the memory units are implemented using a flash memory based on NAND logic gates, the memory units in the ANN input partition/region can be configured to operate in a Single Level Cell (SLC) mode, where each memory cell stores one bit of data for improved endurance in cyclic overwriting operations.

In some implementations, artificial neurons can have state variables that change over time in response to inputs during prediction calculations. For example, the activation level of a spiking neuron can change over time and is considered a dynamic state variable of the spiking neuron. In some implementations, such state variable data of artificial neurons has a similar storage usage pattern as the external input data; and thus, the state variable data can be stored in the partition or region configured for the external input data. In other implementations, the state variable data of artificial neurons is kept in a buffer and stored less frequently than the external inputs; and thus, another partition/region can be configured for storing the dynamic state variable data of artificial neurons.

Output data generated by the artificial neurons in the ANN (125) can be buffered for further access by the neural network accelerator (159) and/or the processor(s) (133) of the computer system (131). The output data can include external outputs and internal outputs. The external inputs are generated by artificial neurons as the output from the ANN (125), such as the results of classifications or predictions made by the ANN (125). The output of the ANN (125) is typically further processed by the processor(s) (133) of the computer system (131). The external inputs may be saved periodically (e.g., in a way similar to the storing of the state variable data). The internal outputs and/or some of the external outputs can be internal inputs to artificial neurons in the ANN (125). In general, it may not be necessary to store the internal outputs from the buffer of the data storage device to the memory components. In some implementations, when the buffer capability of the data storage device (112) is insufficient to hold the entire state variable data and/or the internal outputs, the data storage device (112) can use a swap partition/region to extend the capacity of the buffer. The swap partition/region can be configured for optimized random access and for improved endurance.

External outputs and/or dynamic states of neurons can be saved in a separate output partition or region, in a cyclic way so that the external output data and/or dynamic states of the neurons can be periodically stored, and the most recent sets of the external outputs and/or dynamic states can be found in the data storage device (112). External outputs and/or dynamic states of neurons can be stored selectively, since some of such data can be re-generated by the ANN from the external inputs stored in the input partition or region. Preferably, the output partition or region is configured to store one or more sets of external outputs and/or dynamic states that cannot be created from the external inputs stored in the input partition or region. In storing data in a cyclic way in an input/output partition or region, the oldest stored data sets are erased to make rooms for the most recent data sets. The ANN input/output partition/region can be configured for an optimized sequential write stream for copying data from the buffer of the data storage device into the memory units in the memory components of the data storage device.

FIG. 9 shows a memory capacity (181) configured to support neural network computations according to one embodiment. For example, the memory capacity (181) of the memory components (161 to 163) of the data storage device (112) of FIG. 7 can be configured according to FIG. 9 to support neural network computations.

The memory capacity (181) of FIG. 9 can be implemented using a set of memory components (e.g., 161 to 163) of the data storage device (112).

A set of regions (183, 185, 187, . . . ) can be created on the memory capacity (181) of the data storage device (112). Each of the region (e.g., 183, 185, or 187) corresponds to a named portion of the memory capacity (181). Logical addresses are defined within each region. An address map (191) is configured to map between the logical addresses defined in the regions (183, 185, 187, . . . ) to the physical addresses of memory units in the memory components (e.g., 161 to 163 illustrated in FIG. 7).

The address map (191) can include region optimization settings (192) for the regions (183, 185, and 187).

For example, an ANN model region (183) can be a memory/storage partition configured for the model data of the Artificial Neural Network (ANN) (125). The region optimization settings (192) optimizes the memory operations in the ANN model region (183) according to the data usage pattern of ANN models (e.g., mostly read, infrequent update centric).

For example, a neuron input region (185) can be a memory/storage partition configured for the external input data to the Artificial Neural Network (ANN) (125). The region optimization settings (192) optimizes the memory operations in the neuron input region (185) according to the data usage pattern of the external input data (e.g., for enhanced endurance supporting cyclic overwrite of continuous input data flow for sequential writes).

For example, a neuron output region (187) can be a memory/storage partition/configured for the external output data provided from the Artificial Neural Network (ANN) (125). The region optimization settings (192) optimizes the memory operations in the neuron output region (187) according to the data usage pattern of the external output data (e.g., improved endurance for periodically overwrite of data with random read/write access).

The data storage device (112) includes a buffer configured to store temporary/intermediate data of the Artificial Neural Network (ANN) (125), such as the internal inputs/outputs of the artificial neurons in the ANN (125).

Optionally, a swap region can be configured in the memory capacity (181) to extend the capacity of the buffer (152).

Optionally, the address map (191) includes a mapping between logic memory addresses received in the host interface (157) to access data of artificial neurons and the identities of the artificial neurons. Thus, a read or write command to access one type of data of an artificial neuron in one region can cause the controller 151 to access another type of data of the artificial neuron in another region.

For example, in response to a request to write external input data for a neuron into the memory capacity (181) of the data storage device (112), the address map (191) can be used to calculate the addresses of the model parameters of the neuron in the ANN model region (183) and read the model parameters into the buffer (152) to allow the neural network accelerator (159) to perform the computation of the output of the neuron. The output of the neuron can be saved in the buffer (152) as the internal input to other neurons (e.g., to reduce write amplification). Further, the identities of the other neurons connected to the neuron can also be retrieved from the ANN model region (183) into the buffer (152), which allows the neural network accelerator (159) and/or the processor to further process the propagation of the output in the ANN (125). The retrieval of the model data from the ANN model region (183) can be performed in parallel with the storing of the external input data into the neuron input region (185). Thus, the processors (133) of the computer system (131) of the vehicle (111) do not have to explicitly send in read commands for the retrieval of the model data from the ANN model region (183).

Similarly, in response to reading output data of a neuron, the address map (191) can be used to compute the addresses of the model parameters of the neuron stored in the ANN model region (183) and read the model parameters into the buffer (152) to allow the neural network accelerator (159) to apply internal inputs in the buffer (152) to perform the computation of the output of the neuron. The computed output can be provided as a response to the reading of the output data for the neuron, without the data storage device (112) having to store the output data in the memory components (e.g., 161 to 163). Thus, the processors (133) and/or the neural network accelerator (159) can control the computations of the neuron via writing inputs to neurons and/or reading outputs from neurons.

In general, incoming external input data to the ANN (125) can be raw sensor data (121) generated directly by the sensors (e.g., 122) without processing by the processors (133) and/or the neural network accelerator (159). Alternatively, indirect sensor data (121) that has processed by the processors (133) for the ANN (125) from the signals from the sensors (122) can be provided as the external input data. The incoming external input data can be accepted in the host interface (157) and written in a cyclic way into the neuron input region (185), and automatically buffered in the buffer (152) for neural network accelerator (159) to generate neuron outputs using the model stored in the ANN model region (183). The outputs generated by the neural network accelerator (159) can be further buffered as internal inputs for further application of the model in the ANN model region (183). When the external outputs become available, the data storage device (112) can report the completion of the write requests with an indication of the availability of the external outputs. Optionally, the controller 151 and/or the neural network accelerator (159) can generate internal read commands to propagate signals in the ANN (125) in generating the external outputs. Alternatively, the host processors (133) can control the propagation of signals in the ANN (125) by selectively reading outputs of neurons; and the data storage device (112) can actively buffer data that may be needed in the buffer (152) to accelerate the ANN computation.

FIG. 10 illustrates the configuration of a memory region (183) for an Artificial Neural Network (ANN) model according to one embodiment. For example, the configuration of FIG. 10 can be implemented in the data storage device (112) of FIG. 7 with a logical memory capacity (181) of FIG. 9. For example, the settings (193) of FIG. 10 can be part of the region optimization settings (192) of FIG. 9.

The configuration of FIG. 10 maps an ANN model region (183) to at least one memory component A (161). Preferably, the at least one memory component A (161) can be used by the controller (151) in parallel with memory components (e.g., 163) that hosts the other regions (e.g., 185 and 187) of ANN data. For example, the memory component A (161) can be in an integrated circuit package that is separate from the integrated circuit packages for the other regions (e.g., 185 and 187). Alternatively, the memory components (161 to 163) are formed on separate integrated circuit dies embedded in a same integrated circuit package. Alternatively, the memory components (161 to 163) can be formed on separate regions of an integrated circuit die, where the separate regions can be operated substantially in parallel (e.g., for read, for erase, and/or for write).

In FIG. 10, the settings (193) are optimized to the usage pattern of mostly read and infrequent update.

FIG. 11 illustrates the configuration of a region (185) for the inputs to artificial neurons according to one embodiment. For example, the configuration of FIG. 11 can be implemented in the data storage device (112) illustrated in FIGS. 7 and/or 9. For example, the settings (195) of FIG. 10 can be part of the region optimization settings (192) of FIG. 9.

The configuration of FIG. 11 maps a neuron input region (185) to at least one memory component B (163). Preferably, the at least one memory component B (163) can be used by the controller (151) in parallel with memory components (e.g., 161) that hosts the other regions (e.g., 183 and 187) of ANN data. For example, the memory component B (163) can be in an integrated circuit package that is separate from the integrated circuit packages for the other regions (e.g., 183 and 187). Alternatively, the memory components (161 to 163) are formed on separate integrated circuit dies embedded in a same integrated circuit package. Alternatively, the memory components (161 to 163) can be formed on separate regions of an integrated circuit die, where the separate regions can be operated substantially in parallel (e.g., for read, for erase, and/or for write).

In FIG. 11, the settings (193) are optimized to the usage pattern of enhanced endurance in cyclic sequential overwrite in recording a continuous stream of input data that is sampled at a fixed time interval.

FIG. 12 illustrates the configuration of a region (187) for the outputs from artificial neurons according to one embodiment. For example, the configuration of FIG. 12 can be implemented in the data storage device (112) illustrated in FIGS. 7 and/or 9. For example, the settings (197) of FIG. 12 can be part of the region optimization settings (192) of FIG. 9.

The configuration of FIG. 12 maps a neuron output region (187) to at least one memory component C (162). Preferably, the at least one memory component C (162) can be used by the controller (151) in parallel with memory components (e.g., 161 and 163) that hosts the other regions (e.g., 183 and 185) of ANN data. For example, the memory component C (162) can be in an integrated circuit package that is separate from the integrated circuit packages for the other regions (e.g., 183 and 185). Alternatively, the memory components (161 to 163) are formed on separate integrated circuit dies embedded in a same integrated circuit package. Alternatively, the memory components (161 to 163) can be formed on separate regions of an integrated circuit die, where the separate regions can be operated substantially in parallel (e.g., for read, for erase, and/or for write).

In FIG. 12, the settings (197) are optimized to the usage pattern of buffered data for periodic overwrite with random access. For example, memory units are configured via the optimization settings (193 to 197) to update/overwrite in the neuron output region (187) at a frequency higher than in the ANN model region (183), but lower than in the neuron input region (185).

A communication protocol/interface can be configured to allow a data storage device to perform neural network acceleration on the fly with reduced data traffic to the host system.

For example, the host processor (e.g., 133) of a vehicle (111) can provide write commands to the data storage device (112) to store the model of an artificial neural network in a model partition (e.g., 183).

To use the ANN model in classifications and/or predictions, the host processor (e.g., 133) of a vehicle (111) can optionally stream input data for the ANN (125) into the neuron input partition (e.g., 185). The neural network accelerator (159) of the storage device (112) can automatically apply the images from the sensors (122) and, if there is any, the input data from the host processor (133) to the model stored in ANN model partition (e.g., 183) in accordance with the address map (191). The data storage device (112) makes the computed outputs available for propagation in the ANN (125). Preferably, the computed outputs are made available to the neural network accelerator (159) through the buffer (152) without the need to store the intermediate outputs into memory components (e.g., 161 to 163). Thus, the data communications between the host processor (e.g., 133) and the data storage device (112) for the transporting of outputs of neurons can be reduced. When the outputs have propagated to the output neurons in the ANN (125), the data storage device (112) can provide a response to a request from the host processor (e.g., 133). The response indicates that the external output from neurons in the ANN (125) is available. In response, the host processor (e.g., 133) of a vehicle (111) can optionally issue read commands to retrieve the external outputs for further processing.

Figure 13:
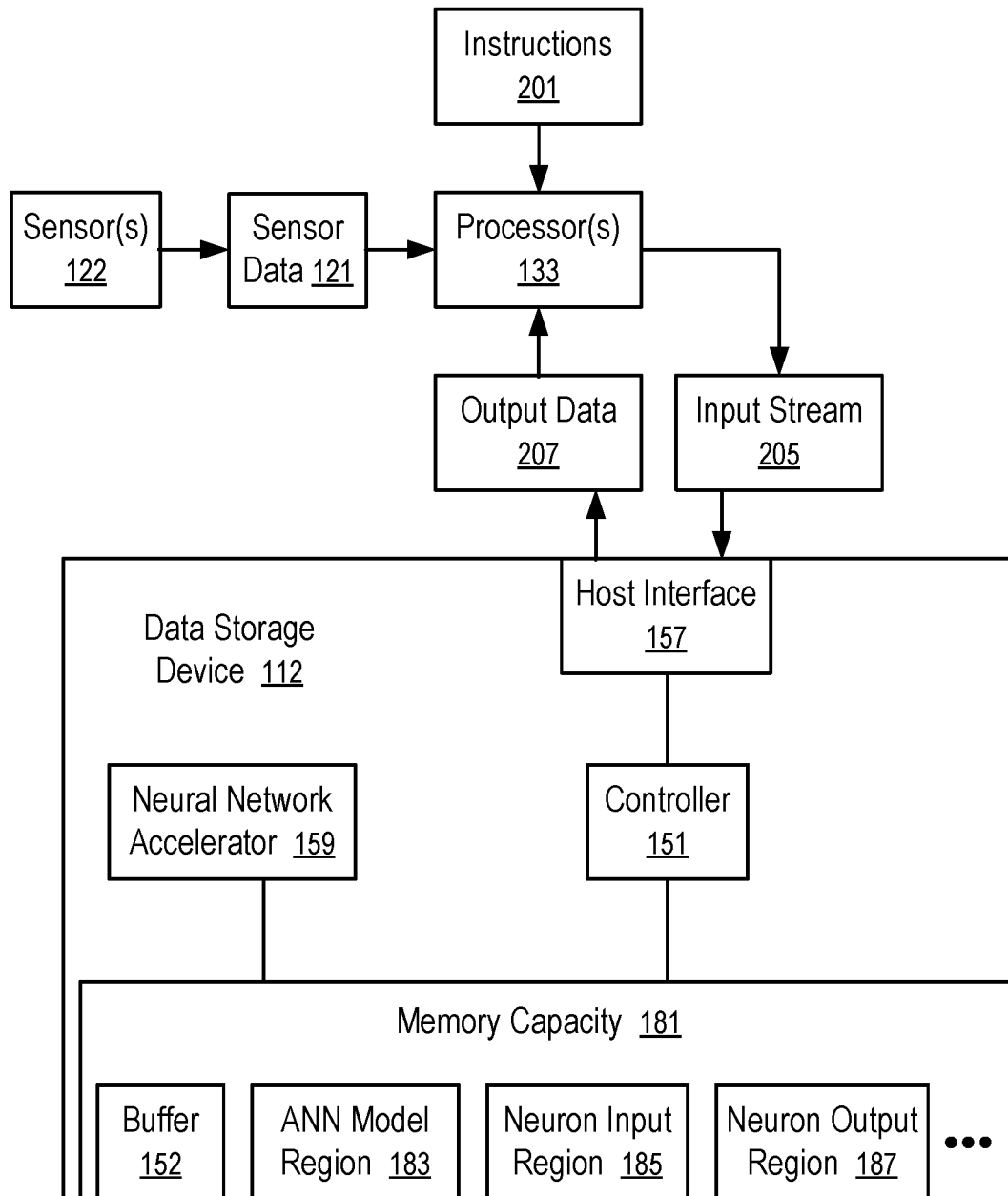
FIG. 13 shows communications between an autonomous vehicle and a data storage device according to one embodiment.

FIG. 13 shows communications between an autonomous vehicle (111) and a data storage device (112) according to one embodiment. For example, the communications as illustrated in FIG. 13 can be implemented in the vehicle (111) of FIG. 2 or 3, with a data storage device (112) illustrated in FIG. 1, or 7.

In FIG. 13, the processor(s) (133) of the host system can be configured with a simplified set of instructions (201) to perform neural network computation, since some of the computations involving the ANN (125) is performed by the neural network accelerator (159) within the data storage device (112). It is not necessary to transport the model data back to the processor(s) (133) during the use of the ANN (125) for predictions and/or classifications.

The sensors (122) can generate a continuous input stream (205) as part of sensor data (121) for the vehicle (111). The sensor data (121) in the input stream (205) can be generated at a fixed, predetermined time interval (e.g., during the operation of the vehicle (111)).

The input stream (205) is applied to input neurons in the ANN (125). Input neurons in the ANN (125) are configured to accept external inputs to the ANN (125); and output neurons are configured to provide external outputs from the ANN (125).

The processor(s) (133) can execute the instructions (201) to process the output data (207) from the data storage device (112) and some of the sensor data (121).

For example, the processor(s) (133) can write the sensor data (121) as part of the input stream (205) into the neuron input region (185) and read from the neuron output region (187) the output data (207) generated by the neural network accelerator (159) using the ANN data in the model region (183).

The data storage device (112) stores the input stream (205) into the neuron input region (185) in a cyclic way where the oldest input set corresponding to the oldest time instance of data sampling for data sets currently stored in the neuron input region (185) is erased to store the newest set of inputs.

For each input data set, the neural network accelerator (159) applies the model of the ANN (125) stored in the ANN model region (183). The neural network accelerator (159) (or the processor(s) (133)) can control the propagation of signals within the neural network. When the output neurons of the ANN (125) generate their outputs responsive to the input data set, the data storage device (112) can provide to the processor (133) an indication that the neuron outputs are ready for retrieval. The indication can be configured in a response to the request from the processor(s) (133) to write the input data set into the neuron input region (185). The processor(s) (133) can optionally retrieve the output data (207) (e.g., in accordance with conditions and/or criteria programmed in the instructions).

In some embodiments, a trigger parameter is configured in the data storage device (112). When an output parameter in the external output (217) meetings a requirement specified by the trigger parameter, the data storage device provides the response to the request from the processor(s) (133) to write the input data set into the neuron input region (185).

Figure 14:
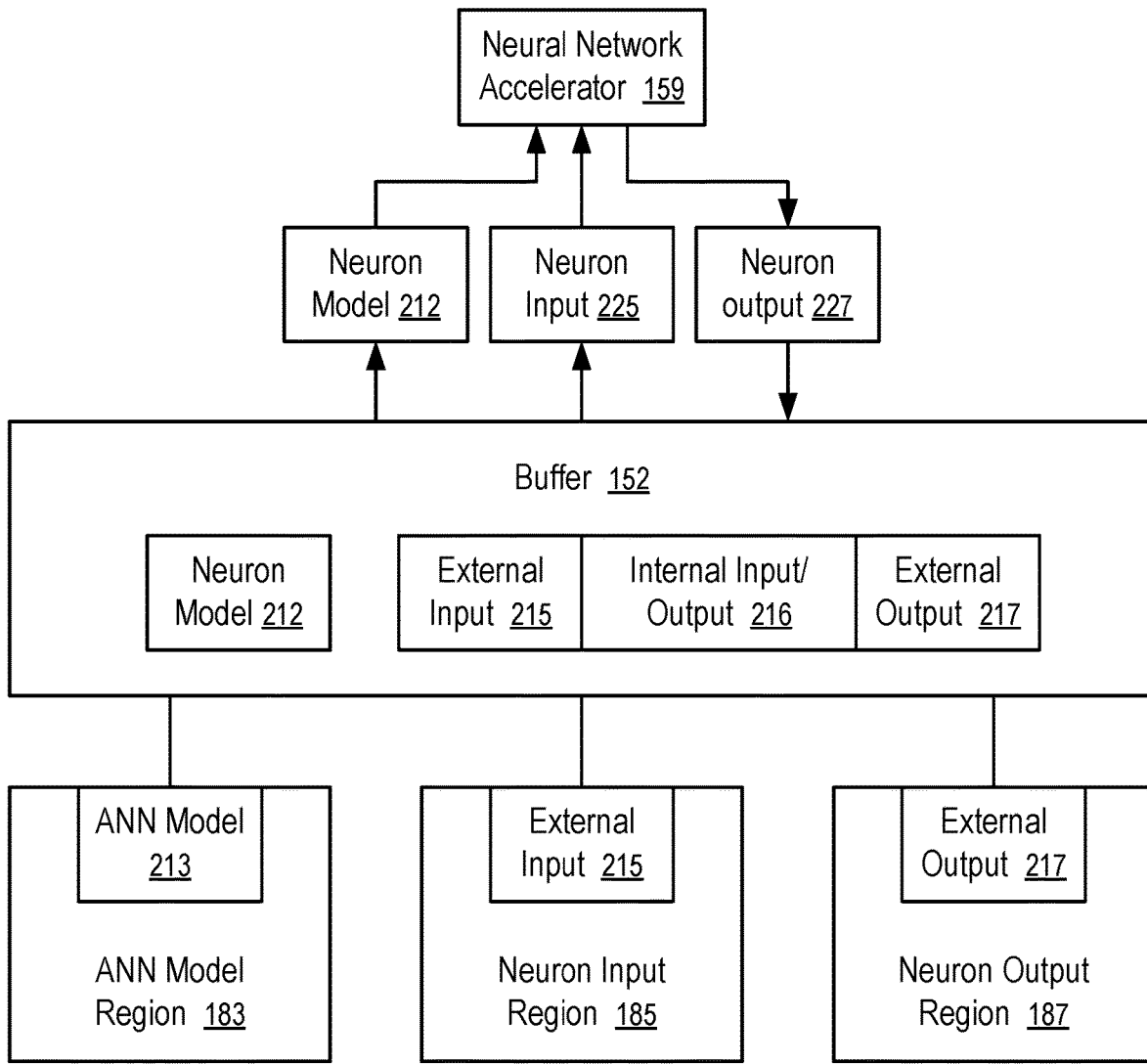
FIG. 14 shows communications within a data storage device according to one embodiment.

FIG. 14 shows communications within a data storage device (112) according to one embodiment. For example, the communications of FIG. 14 can be implemented in a data storage device (112) illustrated in FIG. 1 or 7.

In FIG. 14, the model region (183) stores the model (213) of an ANN (125). In response to receiving a set of external input (215) for a time instance from the input stream (205) in the buffer (152), the data storage device (112) can write the external input (215) into the input region (185) in parallel with retrieving a neuron model (212) containing a portion of the ANN model (213) corresponding to the parameters of the input neurons and/or the identities of neurons connected to the input neurons. The buffer (152) allows the neural network accelerator (159) to combine the neuron model (212) and the external input (225) to generate the output (227) of the input neurons.

In general, the neuron output (227) can include a portion that is the internal output (216) for further propagation within the ANN (125) and/or a portion that is the external output (217) for the processor(s) (133).

The internal output (216) is stored in the buffer (152) as internal input (216) for further propagation in the ANN (125) in a way similar to the generation of neuron outputs (227) from the external input (215). For example, a portion of the internal input (216) can cause the controller (151) and/or the neural network accelerator (159) to retrieve corresponding neuron model (212) relevant to the internal input such that the internal input is applied in the neural network accelerator (159) to the corresponding neuron model (212) to generate their neuron outputs (227).

When the complete set of external output (217) is available in the buffer (152), the external output (217) can be stored into the output region (187).

Optionally, the storage device (112) does not store each set of external output (217) corresponding to a set of stored external input (215) sampled at a time instance. For example, the storage device (112) can be configured to store one set of external output (217) every time when a predetermined number of sets of external input (e.g., 215) has been counted. Alternatively, or in combination, the processor(s) (133) can determine whether or not to store the external output (217). For example, the storage device (112) can be configured to store the external output (217) in response to the processor(s) (133) retrieving the external output (217) for further processing. For example, the storage device (112) can be configured to store the external output (217) in response to a write command from the processor(s) (133) after the processing of the external output (217) in the processor(s) (133).

Figure 15:
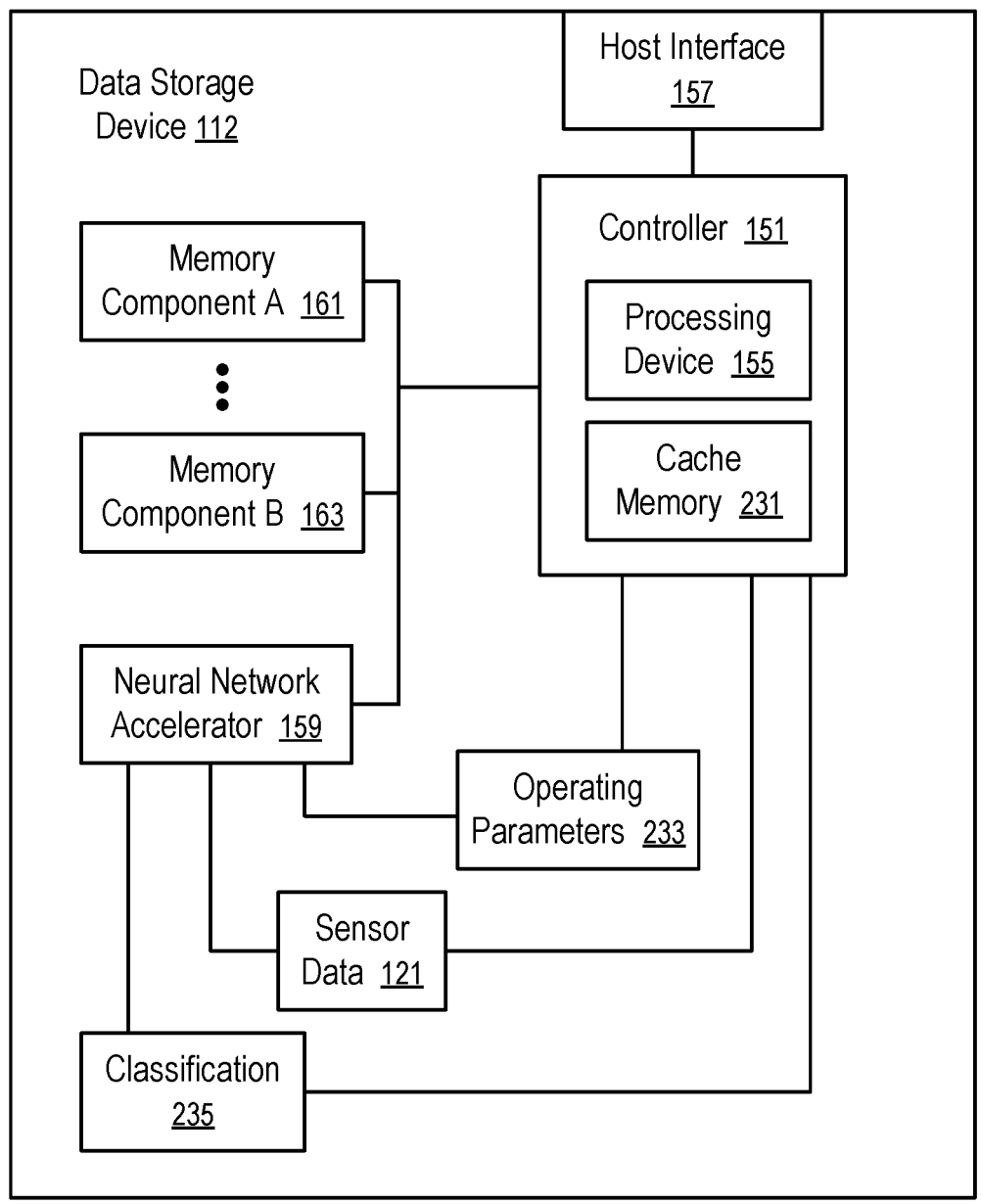
FIG. 15 shows a data storage device configured to monitor an automotive transmission of a vehicle according to one embodiment.

FIG. 15 shows a data storage device (112) configured to monitor an automotive transmission (101) of a vehicle (111)

according to one embodiment. For example, the data storage device of FIG. 15 can be implemented using the techniques of a data storage device (112) of FIG. 1 or 7 in a vehicle (111) illustrated in FIG. 2 or 3.

In FIG. 15, the data storage device (112) includes a neural network accelerator (159), and an ANN model (213) stored in the memory components (161 to 163).

The controller (151) is configured to use the neural network accelerator (159) to make maintenance predictions by using the ANN model (213) to classify the sensor data (121) in connection with the operation parameters (233).

The sensor data (121) includes the input generated by the sensor(s) (103) configured on the automotive transmission (101). Optionally, the sensor data (121) can include inputs from other sensors configured on the vehicle (111).

Optionally, the sensor data (121) of a period of time is stored in the memory components (161 to 163). The neural network accelerator (159) is configured to retrieve the sensor data (121) from the memory components (161 to 163) to perform the computation to identify a classification of the sensor data (121) as normal or abnormal at a time the data storage device would be idling (e.g., when the vehicle is in a parking state).

During a time period that the likelihood of the automotive transmission of the vehicle has normal operations is predetermined to be above a threshold (e.g., within a predetermined time or mileage from initial delivery of the vehicle from a factory), the data storage device (112) can be set in a training mode. Subsequently, the data storage device (112) can be set in a prediction mode.

The sensor data (121) received with the operating parameters (233) in the host interface (157) can be stored initially in an input region (185).

When the data storage device (112) is in a training mode, the pattern(s) in the sensor data (121) and the operating parameters (233) can be assumed to be normal. The controller (151) uses the neural network accelerator (159) to train the ANN (125) to classify the sensor data (121) and the associated operation parameters (233) into clusters that are considered normal. The controller (151) can incrementally train the ANN to recognize normal clusters over the duration of the training period. The oldest training data that have been used to train the ANN (125) can be erased from the input region (185) to store new training data.

When the data storage device (112) is in a prediction mode, the controller (151) uses the neural network accelerator (159) to determine whether the ANN (125) classifies the sensor data (121) and the associated operation parameters (233) to any of the clusters known as normal. When the ANN (125) fails to classify the sensor data (121) and the associated operation parameters (233) to any of the clusters known as normal, the sensor data (121) and the associated operation parameters (233) can be identified as abnormal; and the controller (151) can save the abnormal sensor data (121) and the associated operation parameters (233) into an output region (187).

The computer system (131) of the vehicle (111) can check the output region (187) for identification of abnormal sensor data (121) and the associated operation parameters (233). In a set of abnormal sensor data (121) and the associated operation parameters (233) is found in the output region (187), the computer system (131) of the vehicle (111) can generate a maintenance alert for the user of the vehicle (111). For example, the maintenance alert can be presented in the infotainment system (149) of the vehicle (111) and/or in an instrument panel of the vehicle (111).

When the vehicle (111) is in the maintenance service facility (127), a connection to the computer system (131) can be used to download the abnormal sensor data (121) and the associated operation parameters (233) from the data storage device (112). The downloaded data can be uploaded to a server (119) for analysis. Further, the automotive transmission of the vehicle (111) can be inspected for defects. Optionally, the abnormal sensor data (121) and the associated operation parameters (233) can be transmitted wirelessly (113) through a communication network (117) to the server (119) for remote diagnosis and/or analysis. Based the inspection and analysis, the downloaded sensor data (121) and the associated operation parameters (233) from the data storage device (112) can be confirmed to be abnormal, or reclassified as normal. Further, the condition of the automotive transmission can be classified as abnormal and known to require immediate intervention, or abnormal and know to not require immediate intervention. The confirmation or reclassification can cause the data storage device (112) to further train the ANN (125) to improve its prediction accuracy.

Further, when a problem is discovered from the maintenance visit, the ANN (125) can be further trained to predict the problem based on the sensor data (121) and the associated operation parameters (233) in the output region (187).

In general, an operating condition of the vehicle (111) can be identified via the operating parameters (233). The operating parameters (233) of the vehicle (111) can include the environmental temperature of the vehicle (111), a speed of the vehicle (111), a location of the vehicle (111), a roadway on which the vehicle (111) is traveling, inputs from some of the sensors (122) of the vehicle (111), inference results generated based on the inputs from some of the sensors (122), the status of vehicle controls, the status of the components of the vehicle (111), such as the infotainment system (149) and/or the communication device (139) of the vehicle (111). The operating parameters (233) of the vehicle (111) can include the status and operations of the Advanced Driver Assistance System (ADAS) (128) and/or other applications/components running in the vehicle (111).

Examples of the operating parameters (233) can include inference results generated from the input data stream of the data storage device (112) and/or provided in the output data stream of the data storage device (112).

Figure 16:
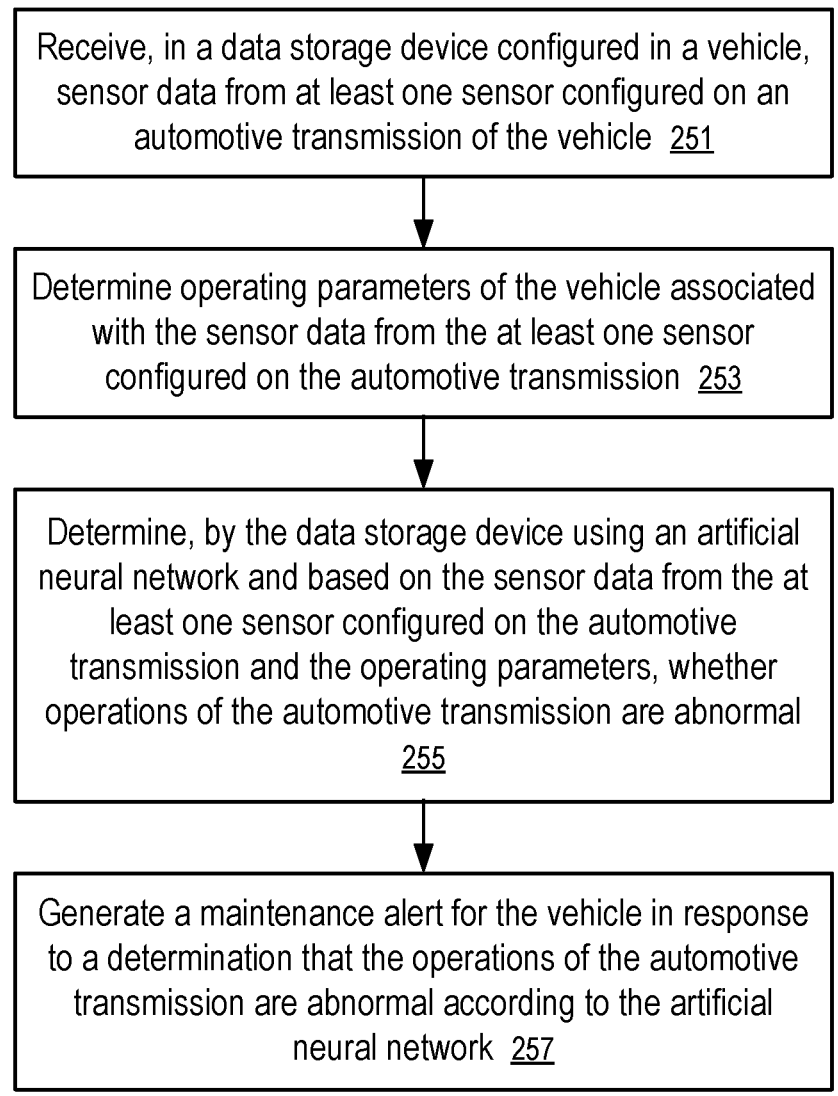
FIG. 16 shows a method to generate predictive maintenance alerts for an automotive transmission of a vehicle according to one embodiment.

FIG. 16 shows a method to generate predictive maintenance alerts for an automotive transmission (101) of a vehicle (111) according to one embodiment. For example, the method of FIG. 16 can be implemented in a data storage device (112) of FIG. 1, 7, 13 or 15 in connection with a computer system (131) or ADAS (128) of FIG. 3 in a vehicle (111) of FIG. 2 or 3.

At block 251, a data storage device (112) configured in a vehicle (111) receives sensor data (121) from at least one sensor (103) configured on an automotive transmission (101) of the vehicle (111).

For example, the at least one sensor (103) configured on the automotive transmission can include a temperature sensor configured in the transmission fluid of the automotive transmission (101), a sensor configured on an input shaft of the automotive transmission (101) to measure the strain, stress, or torque applied on the input shaft, a sensor configured on an output shaft of the automotive transmission (101) to measure the strain, stress, or torque applied on the output shaft, a sensor configured in the transmission fluid of the automotive transmission (101) to measure vibration, or a microphone configured on the case of the automotive transmission (101) to measure noises, or any combination therein.

For example, a host interface (157) of the data storage device (112), or another communication interface, can be configured to receive the sensor data (121) from the at least one sensor (103), or from the processor(s) of the computer system (131) of the vehicle (111).

At block 253, the data storage device (112) determines operating parameters (233) of the vehicle (111) associated with the sensor data (121) from the at least one sensor (103) configured on the automotive transmission (101).

For example, the operating parameters (233) can include an environmental temperature of the autonomous vehicle (111), a speed of the autonomous vehicle (111), a location of the autonomous vehicle (111), an input from a sensor (122) configured on the autonomous vehicle (111), a status of a vehicle control (e.g., 141, 143, 145), a status of an infotainment system (149) of the autonomous vehicle (111), or a status of an advanced driver assistance system (128) of the autonomous vehicle (111), or any combination thereof.

The operating parameters (233) can be determined by the computer system (131) of the vehicle (111) and provided to the data storage device (112) in an input data stream. The vehicle (111) can provide input from other sensors (122) to the data storage device (112); and some of the operating parameters (233) can be determined by the data storage device (112) from the input data from the sensors (122) configured on the vehicle (111).

At block 255, the data storage device (112) determines, using an artificial neural network (125) and based on the sensor data (121) from the at least one sensor (103) configured on the automotive transmission (101) and the operating parameters, whether operations of the automotive transmission (101) are abnormal.

For example, the artificial neural network (125) can include a spiking neural network.

For example, during an initial period of the usage of the vehicle (111) (e.g., within a predetermined time or mileage from the vehicle being delivery from the factory), the vehicle (111) can be assumed to operate normally; and the sensor data (121) can be considered to show normal patterns. The data storage device (112) can be configured in a first mode, in which a neural network accelerator (159) is configured to train the artificial neural network (125) to classify sensor data stored in the data storage device (112) as normal. Subsequently, the data storage device (112) is configured in a second mode, in which the neural network accelerator (159) is configured to determine, using the artificial neural network (125) trained in the first mode, whether sensor data stored in the data storage device (112) is normal or abnormal.

For example, the neural network accelerator (159) is configured to perform matrix arithmetic computations more efficiently than the controller (151).

For example, the storage capacity (181) of the data storage device (112) can include one or more memory components (161, . . . , 163). The storage capacity (181) can be configured to have an input region (185) and an output region (187).

The sensor data received from the at least one sensor (103) configured on the automotive transmission (101) can be stored in the input region (185) of the data storage device (112) cyclically, where the oldest portion of the sensor data stored in the input region (185) is erased to store the incoming portion of sensor data (121) received from the at least one sensor (103) configured on the automotive transmission (101).

For example, in response to the artificial neural network (125) classifying the sensor data (121) of the at least one sensor (103) configured on the automotive transmission (101) as abnormal in view of the operating parameters (233) of the vehicle (111), the controller (151) of the data storage device (112) stores the sensor data (121) and the associated operating parameters (233) of the vehicle (111) in the output region (187) of the data storage device (112).

At block 257, a maintenance alert is generated for the vehicle (111) in response to a determination that the operations of the automotive transmission (101) are abnormal according to the artificial neural network (125).

For example, the computer system (131) of the vehicle (111) can check the output region (187) of the data storage device (112) for presence of data classified as abnormal by the artificial neural network (125). The computer system (131) of the vehicle (111) can present an alert for a maintenance visit in response to detecting the presence of the data classified as abnormal by the artificial neural network (125).

Optionally, the computer system (131) of the vehicle (111) transmits the sensor data (121) in the output region (187), which is classified as abnormal by the artificial neural network (125), to a server (119) through a wireless connection (113) from the vehicle (111). The transmitted data can be analyzed in the server (119) to generate a diagnosis result. Alternatively, when the vehicle (111) visits a maintenance service facility (127), the abnormal sensor data (121) can be downloaded from the output region (187) at the maintenance service facility (127) and uploaded to the server (119) for analysis. When the diagnosis result is available, the artificial neural network (125) in the data storage device (112) and/or in the server (119) can be further trained to predict the diagnosis result based on the abnormal sensor data (121).

The server (119), the computer system (131), and/or the data storage device (112) can each be implemented as one or more data processing systems.

The present disclosure includes methods and apparatuses which perform the methods described above, including data processing systems which perform these methods, and computer readable media containing instructions which when executed on data processing systems cause the systems to perform these methods.

A typical data processing system may include an inter-connect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-1394 bus adapter for controlling IEEE-1394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, Read Only Memory (ROM), Random Access Memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A vehicle, comprising:
   an automotive transmission;
   at least one sensor configured on the automotive transmission to generate sensor data;
   a computer system configured to determine operating parameters of the vehicle, the computer system having:
   one or more memory components configured to store the sensor data; and
   an inference engine configured to determine whether operations of the automotive transmission are abnormal, using an artificial neural network, the sensor data, and the operating parameters;

wherein the computer system is configured to generate a maintenance alert in response to a determination that the operations of the automotive transmission are abnormal according to the artificial neural network.

2. The vehicle of claim 1, wherein the artificial neural network includes a spiking neural network.

3. The vehicle of claim 2, wherein the computer system includes a data storage device having the inference engine and a host interface configured to receive the sensor data; and wherein the data storage device is further configured to generate training data and train the spiking neural network to determine whether the operations of the automotive transmission are abnormal.

4. The vehicle of claim 1, wherein the at least one sensor includes a temperature sensor configured in transmission fluid of the automotive transmission.

5. The vehicle of claim 1, wherein the at least one sensor includes a torque sensor configured on a shaft of the automotive transmission.

6. The vehicle of claim 1, wherein the at least one sensor includes a first torque sensor configured on an input shaft of the automotive transmission and a second torque sensor configured on an output shaft of the automotive transmission.

7. The vehicle of claim 1, wherein the at least one sensor includes a vibration sensor configured in transmission fluid of the automotive transmission.

8. A method, comprising:
receiving, in a data storage device configured in a vehicle, sensor data from at least one sensor configured on an automotive transmission of the vehicle;
determining operating parameters of the vehicle associated with the sensor data from the at least one sensor configured on the automotive transmission;
determining, by the data storage device using an artificial neural network and based on the sensor data from the at least one sensor configured on the automotive transmission and the operating parameters, whether operations of the automobile transmission are abnormal; and
generating a maintenance alert for the vehicle in response to a determination that the operations of the automobile transmission are abnormal according to the artificial neural network.

9. The method of claim 8, wherein the at least one sensor includes a temperature sensor configured in transmission fluid of the automotive transmission, a sensor configured on a shaft of the automotive transmission to measure torque applied on the shaft, a vibration sensor, or a microphone, or any combination thereof.

10. The method of claim 9, further comprising:
storing the sensor data in an input region of the data storage device; and
in response to the artificial neural network classifying the sensor data from the at least one sensor and the operating parameters as abnormal, storing the sensor data in an output region of the data storage device.

11. The method of claim 10, further comprising:
checking, by a computer system of the vehicle, the output region of the data storage device for presence of data classified as abnormal by the artificial neural network; and
presenting by the computer system of the vehicle, an alert for a maintenance visit in response to detecting the presence of the data classified as abnormal by the artificial neural network.

12. The method of claim 11, further comprising:
transmitting, to a server from the output region of the data storage device and via a wireless connection from the vehicle, the data classified as abnormal by the artificial neural network, wherein the transmitted data is analyzed in the server to generate a diagnosis result; and
training the artificial neural network in the data storage device to predict the diagnosis result based on the data stored in the output region and classified as abnormal by the artificial neural network.

13. The method of claim 10, wherein sensor data received from the at least one sensor is stored in the input region of the data storage device cyclically, where an oldest portion of sensor data stored in the input region is erased to store an incoming portion of sensor data from the at least one sensor.

14. The method of claim 9, wherein the operating parameters include an environmental temperature of the autonomous vehicle, a speed of the autonomous vehicle, a location of the autonomous vehicle, an input from a sensor configured on the autonomous vehicle, a status of a vehicle control, a status of an infotainment system of the autonomous vehicle, or a status of an advanced driver assistance system of the autonomous vehicle, or any combination thereof.

15. The method of claim 14, further comprising:
storing sensor data received from the at least one sensor in an input region of the data storage device cyclically;
configuring the data storage device in a first mode;
training the artificial neural network to classify sensor data stored in the input region as normal in the first mode;
configuring the data storage device in a second mode; and
determining, in the second mode and using the artificial neural network trained in the first mode, whether sensor data stored in the input region is normal or abnormal.

16. A data storage device configured in a vehicle, the data storage device comprising:
a host interface configured to receive sensor data from at least one sensor configured on an automotive transmission of the vehicle;
one or more memory components configured to store the sensor data in an input region cyclically;
a controller configured to determine operating parameters of the vehicle associated with the sensor data from the at least one sensor configured on the automotive transmission; and
an inference engine configured to determine, using an artificial neural network and based on the sensor data from the at least one sensor and the operating parameters, whether operations of the automotive transmission are abnormal, wherein a maintenance alert is generated for the vehicle in response to a determination that the operations of the automotive transmission are abnormal according to the artificial neural network.

17. The data storage device of claim 16, wherein the at least one sensor includes a temperature sensor configured in the automotive transmission, a stress sensor configured on a shaft of the automotive transmission, a strain sensor configured on a shaft of the automotive transmission, a vibration sensor configured in the automotive transmission, or a microphone configured on a case of the automotive transmission, or any combination thereof.

18. The data storage device of claim 16, wherein the artificial neural network includes a spiking neural network.

19. The data storage device of claim 18, wherein the controller is configured to copy abnormal sensor data from the input region to an output region in the one or more memory components.

20. The data storage device of claim 18, wherein the inference engine includes a neural network accelerator configured to perform matrix arithmetic computations more efficiently than the controller.

\* \* \* \* \*